United States Patent [19]
Amstein et al.

[11] Patent Number: 5,793,966
[45] Date of Patent: Aug. 11, 1998

[54] COMPUTER SYSTEM AND COMPUTER-IMPLEMENTED PROCESS FOR CREATION AND MAINTENANCE OF ONLINE SERVICES

[75] Inventors: Peter R. Amstein, San Francisco, Calif.; Thomas P. Blumer, Cambridge, Mass.; Arthur L. Coburn, IV; Randy J. Forgaard, both of Lexington, Mass.; Andrew J. Schulert, Cambridge, Mass.; Ted Stefanik, Harvard, Mass.; Robert J. Mauceri, Watertown, Mass.

[73] Assignee: Vermeer Technologies, Inc., Cambridge, Mass.

[21] Appl. No.: 566,281

[22] Filed: Dec. 1, 1995

[51] Int. Cl.⁶ .................................................. G06F 13/00
[52] U.S. Cl. ............................ 395/200.33; 395/200.48
[58] Field of Search .................. 395/200.01, 200.02, 395/200.09, 200.03, 200.15, 200.47, 200.48, 200.49, 200.3, 200.33, 200.68

[56] References Cited

U.S. PATENT DOCUMENTS

| 5,530,852 | 6/1996 | Meske, Jr. et al. | 395/600 |
| 5,537,546 | 7/1996 | Sauter | 395/200.01 |
| 5,572,643 | 11/1996 | Judson | 395/793 |
| 5,579,469 | 11/1996 | Pike | 395/326 |
| 5,623,656 | 4/1997 | Lyons | 395/610 |

OTHER PUBLICATIONS

Heylighen. "World–Wide Web: a distribution hypermedia paradigm for global networking," Apr. 18, 1994, IEE/INSPEC Database Updates and Additions (1960–1995) Doc #1374618; Proceedings SHARE Europe Spring Conference, pp. 355–368, Apr. 1994.

Netscape Navigator Gold 2.0; Press Release from Netecape Communications Corporation; retrieved from internet@ "httl:\\search.netscape.com\newsref\pr\newsrelease42.html": USA, Sep. 18, 1995.

*Primary Examiner*—Mark H. Rinehart
*Attorney, Agent, or Firm*—Ronald M. Anderson

[57] ABSTRACT

A client/server system for authoring an on-line service uses a server machine accessed a client machine which performs authoring operations on information stored on the server machine comprising the on-line service. Requests for authoring operations to be performed on information on the server machine, for authoring the online service, are translated on the client machine into at least one message which is sent to the server machine. The server machine receives the at least one message from the client machine and performs authoring operations identified in the received at least one message so as to author the online service. This information on the server machine is then made accessible by the server machine to other client systems that can be used to access the information without modifying the information, such as a browser. Generally, when the client machine receives a response message from the server machine, it displays information about performance of the authoring operation by the server, using the response message. The client and server may communicate using the HTTP protocol over a TCP/IP connection. The may also have different file name spaces, requiring the server to maintain and perform mapping between identifiers used by the client and those used on the server. The server may have a server program for processing HTTP messages and a server extension program for processing authoring operations. This extension program can be called via the common gateway interface. The authoring operations to be performed can include storing, creating or modifying information, such as documents and scripts and meta-information about services, documents and scripts on the server. Also, operations for providing a listing of services and documents are also available.

17 Claims, 16 Drawing Sheets

```
    [Content directory for example web]
./content

[HTML documents included in the web content]
./content/index.html
./content/pr01.htm
./content/pr02.htm
./content/pr03.htm
./content/news.htm
./content/prod01.htm
./content/inforeq.htm
 /content/prod02.htm
./content/prod03.htm
./content/serv01.htm
./content/serv02.htm
./content/serv03.htm
./content/products.htm
./content/feedback.htm
./content/toc.htm
./content/search.htm

[Image files included in the web content]
./content/images
./content/images/bhome3.gif
./content/images/bnews3.gif
./content/images/bprdsrv3.gif
./content/images/btoc3.gif
./content/images/bfeed3.gif
./content/images/bsrch3.gif
./content/images/hhome3.gif
./content/images/logo.gif
./content/images/div3.gif
./content/images/hnews3.gif
./content/images/smallnew.gif
./content/images/hprdsrv3.gif
./content/images/hprods3.gif
./content/images/prodimg.gif
./content/images/bullet3.gif
./content/images/hservs3.gif
./content/images/hfeed3.gif
./content/images/htoc3.gif
./content/images/hsrch3.gif
./content/images/undercon.gif
```

Fig. 5A

[Document meta information for the HTML documents]
./content/metainfo
./content/metainfo/.htaccess
./content/metainfo/index.html
./content/metainfo/pr01.htm
./content/metainfo/pr02.htm
./content/metainfo/pr03.htm
./content/metainfo/news.htm
./content/metainfo/prod01.htm
./content/metainfo/prod02.htm
./content/metainfo/prod03.htm
./content/metainfo/serv01.htm
./content/metainfo/serv02.htm
./content/metainfo/serv03.htm
./content/metainfo/products.htm
./content/metainfo/feedback.htm
./content/metainfo/toc.htm
./content/metainfo/search.htm
./content/metainfo/inforeq.htm

[Document meta information for the image files]
./content/images/metainfo
./content/images/metainfo/bhome3.gif
./content/images/metainfo/bnews3.gif
./content/images/metainfo/bprdsrv3.gif
./content/images/metainfo/btoc3.gif
./content/images/metainfo/bfeed3.gif
./content/images/metainfo/bsrch3.gif
./content/images/metainfo/hhome3.gif
./content/images/metainfo/logo.gif
./content/images/metainfo/div3.gif
./content/images/metainfo/hnews3.gif
./content/images/metainfo/smallnew.gif
./content/images/metainfo/hprdsrv3.gif
./content/images/metainfo/hprods3.gif
./content/images/metainfo/prodimg.gif
./content/images/metainfo/bullet3.gif
./content/images/metainfo/hservs3.gif
./content/images/metainfo/hfeed3.gif
./content/images/metainfo/htoc3.gif
./content/images/metainfo/hsrch3.gif
./content/images/metainfo/undercon.gif

Fig. 5B

[Web meta information]
./content/_vti_pvt
./content/_vti_pvt/service.cnf

[Information about web locking mechanism]
./content/_vti_pvt/service.lck

[Web server specific access control information]
./content/_vti_pvt/service.pwd
./content/_vti_pvt/service.grp
./content/_vti_pvt/service.dat
./content/.htaccess
./content/_vti_pvt/.htaccess

[Task list of unfinished tasks to guide the author during web creation]
./content/_vti_pvt/_x_todo.htm
./content/_vti_pvt/_x_todoh.htm

[Document meta information for the task list]
./content/_vti_pvt/metainfo
./content/_vti_pvt/metainfo/_x_todo.htm
./content/_vti_pvt/metainfo/_x_todoh.htm

[Database of document dependencies]
./content/_vti_pvt/doctodep.btr
./content/_vti_pvt/deptodoc.btr

[Private content not accessible to aweb browser]
./content/_private
./content/_private/.htaccess
./content/_private/_vti_shm
./content/_private/metainfo
./content/_private/metainfo/navbar.htm
./content/_private/navbar.htm

Fig. 5C

```
       [Text index for all text documents in the web]
./content/_vti_txt
./content/_vti_txt/.htaccess
./content/_vti_txt/default.wti
./content/_vti_txt/default.wti/All.fmt
./content/_vti_txt/default.wti/All.doc
./content/_vti_txt/default.wti/All.fn
./content/_vti_txt/default.wti/All.hl
./content/_vti_txt/default.wti/All.inv
./content/_vti_txt/default.wti/All.dct
./content/_vti_txt/default.wti/All.src
./content/_vti_txt/default.wti/All.cat
./content/_vti_txt/default.wti/All.idx

[Source documents for documents that contain dynamic content]
./content/_vti_shm
./content/_vti_shm/.htaccess
./content/_vti_shm/index.html
./content/_vti_shm/pr01.htm
./content/_vti_shm/pr02.htm
./content/_vti_shm/pr03.htm
./content/_vti_shm/news.htm
./content/_vti_shm/prod01.htm
./content/_vti_shm/prod02.htm
./content/_vti_shm/prod03.htm
./content/_vti_shm/serv01.htm
./content/_vti_shm/serv02.htm
./content/_vti_shm/serv03.htm
./content/_vti_shm/products.htm
./content/_vti_shm/feedback.htm
./content/_vti_shm/toc.htm
./content/_vti_shm/search.htm
./content/_vti_shm/inforeq.htm
```

Fig. 5D

[CGI programs and scripts that implement the server extensions]
./content/_vti_bin
./content/_vti_bin/_vti_adm
./content/_vti_bin/_vti_adm/admin.exe
./content/_vti_bin/_vti_adm/.htaccess
./content/_vti_bin/_vti_aut
./content/_vti_bin/_vti_aut/author.exe
./content/_vti_bin/_vti_aut/.htaccess
./content/_vti_bin/shtml.exe
./content/_vti_bin/.htaccess

[Area for custom CGI programs and scripts created by the author]
./content/cgi-bin
./content/cgi-bin/.htaccess

Fig. 5E

```
vti_title:SR|Zephyr Press Release 1
vti_cachedbasedtm:TX|19 Nov 1995 10:47:42 EST
vti_cachedtitle:SR|Zephyr Press Release 1
vti_cachedtitledtm:TX|19 Nov 1995 10:47:50 EST
vti_cachedlinkinfo:VX|
      S|images/logo.gif
      I| private/navbar.htm
     -H|index.html-
      S|images/bhome3.gif
     -H|news.htm
     -S|images/bnews3.gif
     -H|products.htm
     -S|images/bprdsrv3.gif
     -H|toc.htm
     -S|images/btoc3.gif
     -H|feedback.htm
     -S|images/bfeed3.gif
     -H|search.htm
     -S|images/bsrch3.gif
      S|images/undercon.gif
      H|mailto:info@zephyr.com
      I|_private/navbar.htm
     -H|index.html
     -S|images/bhome3.gif
     -H| news.htm
     -S|images/bnews3.gif
     -H|products.htm
     -S|images/bprdsrv3.gif
     -H|toc.htm
     -S|images/btoc3.gif
     -H|feedback.htm
     -S|images/bfeed3.gif
     -H|search.htm
     -S|images/bsrch3.gif
      H|mailto:webmaster@zephyr.com
vti_cachedlinkinfodtm:TX|19 Nov 1995 10:47:42 EST
vti_extenderversion:SR|1.0.3.3
vti_timelastmodified:TR|19 Nov 1995 10:47:33 EST
vti_timecreated:TR|19 Nov 1995 10:47:33 EST
vti_author:SW|username
vti_modifiedby:SW|username
```

Fig. 6B

```
vti_httpdversion:SX|NCSA/1.3
vti_extenderversion:SR|1.0.3.3
vti_timecreated:TR|19 Nov 1995 10:46:41 EST
vti_welcomenames:VX|index.html
vti_casesensitiveurls:IX|1
vti_restartmanual:IX|0
vti_autorecalc:IX|1
vti_longfilenames:IX|1
vti_htmlextensions:SX|.html.htm.htm.
vti_textextensions:SX|.txt.
companyemail:SW|info@zephyr.com
companylongname:SW|Zephyr Autowerks
companyshortname:SW|Zephyr
companyphone:SW|517-890-1000
companywebmaster:SW|webmaster@zephyr.com
companyaddress:SW|123 Piston Drive, Midland, MI 48640
companyfax:SW|517-890-1001
```

Fig. 6C

```
POST /_vti_bin/_vti_aut/author.exe HTTP/1.0
Date: Wed, 29 Nov 1995 22:24:26 GMT
MIME-Version: 1.0
User-Agent: Vermeer FrontPage Server Extensions Client Library/1.0
Authorization: Basic dTpw
Content-Length: 1812
Content-Type: application/x-vermeer-urlencoded
X-Vermeer-Content-Type: application/x-vermeer-urlencoded method=put+document%3a1%2e0%2e2%2e0&service%5fname=&
document=%5bdocument%5fname%3dindex%2ehtml%3bmeta%5finfo%3d%5b
vti%5ffilesize%3bIX%7c974%3bvti%5fextenderversion
%3bSR%7c1%2e0%2e3%2e3%3bvti%5ftitle%3bSR%7cWebExtender+Operations%3b
vti%5flinkinfo%3bVX%7cFH%7c%5fvti%5fbin%2fserver%5finfo+FH%7c
getver%2ehtm+FH%7clistsrvc%2ehtm+FH%7ccreatsvc%2ehtm+FH%7c
opensvc%2ehtm+FH%7crensvc%2ehtm+FH%7cremovsvc%2ehtm+FH%7c
getdoc%2ehtm+FH%7clistdocs%2ehtm+FH%7clistdirs%2ehtm+FH%7c
creatdir%2ehtm+FH%7cremovdir%2ehtm+FH%7cmarkexec%2ehtm+FH%7c
recalc%2ehtm+FH%7cremovlnk%2ehtm+NH%7c%5fvti%5fbin%2f
RefreshFidelity%3bvti%5fmodifiedby%3bSW%7cu%5d%5d&put%5foption=edit
    <!DGCTYPE HTML PUBLIC "-//W3O//DTD W3 HTML 2.0//EN">

<html>
<head>
<title>WebExtender Operations</title>
<meta name="GENERATOR" content="Vermeer FrontPage 1.0">
</head><body>
<h1>A WebExtender Operations</h1>
<p><a href="/_vti_bin/server_info">Get Information on this Server</a>
</p><p><a href="getver.htm">Get Version</a> </p>
<p><a href="listsrvc.htm">List Services </a></p>
<p><a href="creatsvc.htm">Create Service</a> </p>
<p><a href="opensvc.htm">Open Service</a> </p>
<p><a href=rensvc.htm">Rename Service</a> </p>
<p><a href="removsvc.htm">Remove Service</a> </p>
<p><a href="getdoc.htm">Get Document</a> </p>
<p><a href="listdocs.htm">List Documents</a> </p>
<p><a href="listdirs.htm">List URL-Directories</a> </p>
<p><a href="creatdir.htm">Create URL-Directory</a> </p>
<p><a href="removdir.htm">Remove URL-Directory</a> </p>
<p><a href="markexec.htm">Mark URL-Directory Executable</a> </p>
<p><a href="recalc.htm">Enable/Disable dependency recalc</a> </p>
<p><a href="removlnk.htm">Remove Links from Document</a> </p>
<p><a href="/_vti_bin/RefreshFidelity">Refresh contents of /fid-inv
service</a> </p></body></html>
```

Fig. 9

```
HTTP/1.0 200 Document follows
Date:  Wed, 29 Nov 1995 22:23:59 GMT
Server:  NCSA/1.5
Content-type:  application/x-vermeer-rpc <html><head><title>vermeer RPC packet</title></head>
<body>
<p>method=put document:1.0.2.0
<p>message=successfully put document 'index.html' as
    /usr/local/www/t8143/content/_vti_shm/index.html'
<p>document=
<ul>
<li>document_name=index.html
<li>meta_info=
<ul>
<li>vti_extenderversion
<li>SR|1.0.3.3
<li>vti_timelastmodified
<li>TR|29 Nov 1995 17:24:00 EST
<li>vti_filesize
<li>IX|1166
<li>vti_linkinfo
<li>vX|FH|_vti_bin/server_info FH|getver.htm FH|listsrvc.htm
FH|creatsvc.htm FH|opensvc.htm FH|rensvc.htm FH|removsvc.htm
FH|getdoc.htm FH|listdocs.htm FH|listdirs.htm FH|creatdir.htm
FH|removdir.htm FH|markexec.htm FH|recalc.htm FH|removlnk.htm
NH|_vti_bin/RefreshFidelity
<li>vti_timecreated
<li>TR|29 Nov 1995 17:24:00 EST
<li>vti_title
<li>SR|WebExtender Operations
<li>vti_modifiedby
<li>SW|u
</ul>
</ul>
</body>
</html>
```

Fig. 10

COMPUTER SYSTEM AND COMPUTER-IMPLEMENTED PROCESS FOR CREATION AND MAINTENANCE OF ONLINE SERVICES

FIELD OF THE INVENTION

This invention is related to computer systems for authoring electronic documents, other information and computer programs. More particularly, this invention is related to computer systems for creating, developing and/or modifying on-line services in a client-server information system.

BACKGROUND OF THE INVENTION

An on-line information system typically includes one computer system (the server) that makes information available so that other computer systems (the clients) can access the information. The server manages access to the information, which can be structured as a set of independent on-line services. The server and client communicate via messages conforming to a communication protocol and sent over a communication channel such as a computer network or through a dial-up connection.

Typical uses for on-line services include document viewing, electronic commerce, directory lookup, on-line classified advertisements, reference services, electronic bulletin boards, document retrieval, electronic publishing, keyword searching of documents, technical support for products, and directories of on-line services, among others. The service may make the information available free of charge, or for a fee and may be on publicly accessible or private computer systems.

Information sources managed by the server may include files, databases and applications on the server system or on an external computer system. The information that the server provides simply may be stored on the server, may be converted from other formats manually or automatically, may be computed on the server in response to a client request, may be derived from data and applications on the server or other machines, or may be derived by any combination of these techniques.

The user of an on-line service uses a program on the client system to access the information managed by the on-line service. Possible user capabilities include viewing, searching, downloading, printing, and filing the information managed by the server. The user may also price, purchase, rent, or reserve services or goods offered through the on-line service.

For example, an on-line service for catalog shopping might work as follows. The user runs a client program on the client system and requests a connection to the catalog shopping service using a service name that either is well known or can be found in a directory. The request is received by the server, and the server returns an introductory document that also asks for an identifier and password. The client program displays this document, the user fills in an identifier and password that were assigned by the service in a previous visit, and the user's information is sent to the server. The server verifies the identifier and password against an authorization database, and returns a menu document that is then presented to the user. Each time the user selects a menu item, the selection is sent to the server and the server responds with the appropriate new page of information, possibly including item descriptions or prices that are retrieved from a catalog database. By selecting a series of menu items the user navigates to the desired item in the catalog, and requests that the item be ordered. The server receives the order request, and returns a form where the user fills in some information about shipping and billing. The user response is returned to the server, and the server enters the order information into an order database.

On-line services are available on the World Wide Web (WWW), operating over the global Internet in which a large number of computers, or sites, are interconnected. Similar services are available on private networks that may not be connected to the Internet, such as internal corporate LANs. The WWW and similar private architectures provide a "web" of interconnected document objects. On the WWW, these document objects are located on various sites on the global Internet. The WWW is also described in "The World-Wide Web," by T. Berners-Lee, R. Cailliau, A. Luotonen, H. F. Nielsen, and A. Secret, *Communications of the ACM*, 37 (8), pp. 76–82, August 1994, and in "World Wide Web: The Information Universe," by Berners-Lee, T., et al., in *Electronic Networking: Research, Applications and Policy*, Vol. 1, No. 2, Meckler, Westport, Conn., Spring 1992.

Among the types of document objects in an on-line service are documents and scripts. Documents that are published on the WWW are written in the Hypertext Markup Language (HTML), such as described in *HyperText Markup Language Specification*-2.0, by T. Berners-Lee and D. Connolly, RFC 1866, proposed standard, November 1995, and in "World Wide Web & HTML," by Douglas C. McArthur, in *Dr. Dobbs Journal*, December 1994, pp. 18–20, 22, 24, 26 and 86. Many companies are developing their own enhancements to HTML also. HTML documents stored as such are generally static, that is, the contents do not change over time unless the service developer modifies the document. Scripts are programs that can generate HTML documents when executed.

HTML is a language used for writing hypertext documents. The formal definition is that HTML documents are Standard Generalized Markup Language (SGML) documents that conform to a particular Document Type Definition (DTD). An HTML document includes a hierarchical set of markup elements, where most elements have a start tag, followed by content, followed by an end tag. The content is a combination of text and nested markup elements. Tags are enclosed in angle brackets ('<'and'>') and indicate how the document is structured and how to display the document, as well as destinations and labels for hypertext links. There are tags for markup elements such as titles, headers, text attributes such as bold and italic, lists, paragraph boundaries, links to other documents or other parts of the same document, in-line graphic images, and many other features.

For example, here are several lines of HTML:

Some words are <B>bold</B>, others are <I>italic</I>.
Here we start a new
paragraph.<P>Here's a link to
the <A HREF="http://www.vermeer.com">Vermeer Technologies, Inc.</A>home
page.

This sample document is a hypertext document because it contains a "link" to another document, as provided by the "HREF=." The format of this link will be described below. A hypertext document may also have a link to other parts of the same document. Linked documents may generally be located anywhere on the Internet. When a user is viewing the document using a client program called a Web browser (described below), the links are displayed as highlighted words or phrases. For example, using a Web browser, the sample document above would be displayed on the user's screen as follows:

Some words are bold, others are italic. Here we start a new paragraph.

Here's a link to *Vermeer Technologies Inc.* home page.

In the Web browser, the link may be selected, for example by clicking on the highlighted area with a mouse. Selecting a link will cause the associated document to be displayed. Thus, clicking on the highlighted text "Vermeer Technologies, Inc." would display that home page.

Another kind of document object in a web is a script. A script is an executable program, or a set of commands stored in a file, that can be run by a server program called a Web server (described below) to produce an HTML document that is then returned to the Web browser. Typical script actions include running library routines or other applications to get information from a file or a database, or initiating a request to get information from another machine, or retrieving a document corresponding to a selected hypertext link. A script may be run on the Web server when, for example, the end user selects a particular hypertext link in the Web browser, or submits an HTML form request. Scripts are usually written by a service developer in an interpreted language such as Basic, Practical Extraction and Report Language (Perl) or Tool Control Language (Tcl) or one of the Unix operating system shell languages, but they also may be written in programming languages such as the "C" programming language and then compiled into an executable program. Programming in Tcl is described in more detail in *Tcl and the Tk Toolkit*, by John K. Ousterhout, Addison-Wesley, Reading, MA, USA, 1994. Perl is described in more detail in *Programming in Perl*, by Larry Wall and Randal L. Schwartz, O'Reilly & Associates, Inc., Sebastopol, Calif. USA, 1992.

Each document object in a web has an identifier called a Universal Resource Identifier (URI). These identifiers are described in more detail in T. Berners-Lee, *"Universal Resource Identifiers in WWW: A Unifying Syntax for the Expression of Names and Addresses of Objects on the Network as used in the World-Wide Web,"* RFC 1630, CERN, June 1994; and T. Berners-Lee, L. Masinter, and M. McCahill, *"Uniform Resource Locators(URL),"* RFC 1738, CERN, Xerox PARC, University of Minnesota, December 1994. A URI allows any object on the Internet to be referred to by name or address, such as in a link in an HTML document as shown above. There are two types of URIs: a Universal Resource Name (URN) and a Uniform Resource Locator (URL). A URN references an object by name within a given name space. The Internet community has not yet defined the syntax of URNs. A URL references an object by defining an access algorithm using network protocols. An example URL is "http://www.vermeer.com" A URL has the syntax "scheme://host:port/path?search" where "scheme" identifies the access protocol (such as HTTP, FTP or GOPHER);

"host" is the Internet domain name of the machine that supports the protocol;

"port" is the transmission control protocol (TCP) port number of the appropriate server (if different from the default);

"path" is a scheme-specific identification of the object; and

"search" contains optional parameters for querying the content of the object.

URLs are also used by web servers and browsers on private computer systems or networks and not just the WWW.

A site that wishes to make documents available to network users is called a "Web site" and must run a "Web server" program to provide access to the documents. A Web server program is a computer program that allows a computer on the network to make documents available to the rest of the WWW or a private web. The documents are often hypertext documents in the HTML language, but may be other types of document objects as well, as well as images, audio and video information. The information that is managed by the Web server includes hypertext documents that are stored on the server or are dynamically generated by scripts on the Web server. Several Web server software packages exist, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Sparc 11 workstation running the Unix operating system, and personal computers with the Intel Pentium processor running the Microsoft MS-DOS operating system and the Microsoft Windows operating environment.

Web servers also have a standard interface for running external programs, called the Common Gateway Interface (CGI). CGI is described in more detail in *How To Set Up And Maintain A Web Site*, by Lincoln D. Stein, Addison-Wesley, August 1995. A gateway is a program that handles incoming information requests and returns the appropriate document or generates a document dynamically. For example, a gateway might receive queries, look up the answer in an SQL database, and translate the response into a page of HTML so that the server can send the result to the client. A gateway program may be written in a language such as "C" or in a scripting language such as Perl or Tcl or one of the Unix operating system shell languages. The CGI standard specifies how the script or application receives input and parameters, and specifies how any output should be formatted and returned to the server.

Generally speaking, for security reasons, a Web server machine may limit access to files. For all access to files on the Web server, the Web server program running on the server machine may provide an extra layer of security above and beyond the normal file system and login security procedures of the operating system on the server machine. The Web server program may add further security rules such as: 1) optionally requiring user name and password, completely independent of the normal user name and passwords that the operating system may have on user accounts, 2) allowing definitions of groups of users for security purposes, independent of any user group definitions of the operating system, 3) access control for each document object such that only specified users (with optional passwords) or groups of users are allowed access to the object, or that access is only allowed for clients at specific network addresses, or some combination of these rules, 4) allowing access to the document objects only through a specified subset of the possible HTTP methods, 5) allowing some document objects to be marked as HTML documents, others to be marked as executable scripts that will generate HTML documents, and others to be marked as other types of objects such as images. Access to the online service document objects via a network file system would not conform to the security features of the Web server program and would provide a way to access documents outside of the security provided by the Web server. The Web server program also typically maps document object names that are known to the client to file names on the server file system. This mapping may be arbitrarily complex, and any author or program that tried to access documents on the Web server directly would need to understand this name mapping.

A user (typically using a machine other than the machine used by the Web server) that wishes to access documents available on the network at a Web site must run a client program called a "Web browser." The browser program allows the user to retrieve and display documents from Web servers. Some of the popular Web browser programs are: the Navigator browser from NetScape Communications Corp., of Mountain View, Calif.; the Mosaic browser from the National Center for Supercomputing Applications (NCSA); the WinWeb browser, from Microelectronics and Computer Technology Corp. of Austin, Tex.; and the Internet Explorer, from Microsoft Corporation of Redmond, Wash. Browsers exist for many platforms, including personal computers with the Intel Pentium processor running the Microsoft MS-DOS operating system and the Microsoft Windows environment, and Apple Macintosh personal computers.

The Web server and the Web browser communicate using the Hypertext Transfer Protocol (HTTP) message protocol and the underlying transmission control protocol/internet protocol (TCP/IP) data transport protocol of the Internet. HTTP is described in *Hypertext Transfer Protocol-HTTP/ 1.0*, by T. Berners-Lee, R. T. Fielding, H. Frystyk Nielsen, Internet Draft Document, Oct. 14, 1995, and is currently in the standardization process. In HTTP, the Web browser establishes a connection to a Web server and sends an HTTP request message to the server. In response to an HTTP request message, the Web server checks for authorization, performs any requested action and returns an HTTP response message containing an HTML document resulting from the requested action, or an error message. The returned HTML document may simply be a file stored on the Web server, or it may be created dynamically using a script called in response to the HTTP request message. For instance, to retrieve a document, a Web browser sends an HTTP request message to the indicated Web server, requesting a document by its URL. The Web server then retrieves the document and returns it in an HTTP response message to the Web browser. If the document has hypertext links, then the user may again select a link to request that a new document be retrieved and displayed. As another example, a user may fill in a form requesting a database search, the Web browser will send an HTTP request message to the Web server including the name of the database to be searched and the search parameters and the URL of the search script. The Web server calls a program or script, passing in the search parameters. The program examines the parameters and attempts to answer the query, perhaps by sending a query to a database interface. When the program receives the results of the query, it constructs an HTML document that is returned to the Web server, which then sends it to the Web browser in an HTTP response message.

Request messages in HTTP contain a "method name" indicating the type of action to be performed by the server, a URL indicating a target object (either document or script) on the Web server, and other control information. Response messages contain a status line, server information, and possible data content. The Multipurpose Internet Mail Extensions (MIME) are a standardized way for describing the content of messages that are passed over a network. HTTP request and response messages use MIME header lines to indicate the format of the message. MIME is described in more detail in *MIME(Multipurpose Internet Mail Extensions): Mechanisms for Specifying and Describing the Format of Internet Message Bodies*, Internet RFC 1341, June 1992.

The request methods defined in the current version of the HTTP protocol include GET, POST, PUT, HEAD, DELETE, LINK, and UNLINK. HEAD, DELETE, LINK and UNLINK are less commonly used and are described in more detail in the HTTP/1.0 draft specification cited above.

The GET method requests that the server retrieve the object indicated by the given URL and send it back to the client. If the URL refers to a document, then the server responds by sending back the document. If the URL refers to an executable script, then the server executes the script and returns the data produced by the execution of the script. Web browser programs normally use the GET method to send request messages to the Web server to retrieve HTML documents, which the Web browser then displays on the screen at the client computer.

The PUT method, according to the HTTP specification, specifies that the object contained in the request should be stored on the server at the location indicated by the given URL. However, most current server implementations do not follow this specification; they simply handle all PUT requests through a single PUT script, which is generally undefined, and must be created by a service author. Web browsers generally do not use the PUT method.

The POST method sends data, usually the user input parameters from an HTML form, to the server. The POST request also contains the URL of a script to be run on the server. The server runs the script, passing the parameters given in the request, and the script generates HTML output to be returned in the response to the client. In order for a client program to send arbitrary data to the Web server using the current HTTP protocol, the client program must use either the PUT method or the POST method, as these are the only two methods that allow such data transfer to the Web server.

Web browsers generally use only the POST method and generally only for the purpose of sending data in connection with forms to be processed.

The combination of the Web server and Web browser communicating using an HTTP protocol over a computer network is referred to herein as a web architecture. Having now described a web architecture, such as may be used in private LANs or the Internet, a typical on-line service for use on a web architecture will now be described. An on-line service for use on a web architecture includes a Web server program running on a Web server machine, and a set of service files that characterize the on-line services that are stored on the Web server machine. The service files include HTML documents, executable scripts or programs to dynamically produce HTML documents, and other files of service information that can be referenced and updated by the scripts and programs. The actual data and scripts that make up a particular on-line service, including HTML documents and script programs, are generally stored on the server in a separate area for each service. Global information about the service is also stored, including data such as the name of the service, the name of the author, revision history, comments about the service, and authorization information. The end user of the on-line service uses a Web browser program on the client machine to send requests to the on-line service and to receive responses from the on-line service. All access by an end user of the on-line service to the service files is managed and controlled by the Web server program. For example, an on-line service might consist of a corporate home page which is a document, with a link to a second document that is a form for searching the store catalog. The search form may have a "submit" button that causes a script to be run on the Web server, to generate a list of product descriptions with prices that is then returned to the Web browser as an HTML document. Each of the HTML documents may have a link to a second script that collects and displays the items that have been ordered. The service also has configuration information such as the list of authorized users of the service, and their passwords.

FIG. 1 shows the steps in using an on-line service, as seen by the end user of the on-line service on the client machine. The end user starts a Web browser program in step 10, and the program determines the URL of an initial document to display in step 12. The initial document URL may be determined from a configuration file, or may be programmed into the Web browser, or may be entered by the user. The browser then sends an HTTP GET request to the Web server in step 14, giving the URL of the desired document. The browser then waits for a response from the Web server in step 16. The browser tests the response in step 18 to determine if it indicates an error message. If the response message from the Web server indicates an error, for instance if the requested document is not found, then the browser reports the error to the end user in step 22. Otherwise the response message from the Web server contains the requested document, and the Web browser formats and displays the document on the screen in step 20 according to the HTML language conventions. In either case the browser then waits for the user to enter the next command (step 24). For example, the user may request to view a new document by selecting a hypertext link to a document, by requesting a document from a list of previously visited documents, or by typing in the URL of a document that was obtained by the user through some other means. The browser tests the user command to determine if the user is requesting a new document in step 26. If so, processing continues at step 14 which has already been discussed. If the user is not requesting a new document then the browser tests the command in step 30 to determine if it is a request to exit the program. If so, processing stops. Otherwise the command is a local command that is handled by the browser without sending an HTTP request in step 28. The end user may use local viewing commands such as commands to scroll around in the document, or commands to search for a particular text string in the document. After the browser handles the local command, the browser again waits for the next user command as already discussed, in step 24.

FIG. 2 shows the operation of an on-line service as seen by the Web server program. When the server is started, it runs continuously, waiting to receive a command over the network connection from a client Web browser program in step 40. The server tests the received command in step 44 to determine if it is a GET request. If it is a GET request, then the server examines the URL contained in the request in step 52 to determine if the URL indicates a HTML document stored on the server. If the URL does refer to a document then that document is returned to the Web browser via an HTTP response in step 58. Otherwise the URL indicates a script stored on the server, and the Web server runs the script to produce an HTML document in step 56 which is then returned to the Web browser as described before in step 58. If the test of step 44 determines that the command is not a GET request, then the server tests the command in step 48 to determine if it is a POST request. If so, the server retrieves the parameters from the POST request in step 54, which include the URL for the script and the parameters for the script. The server then runs the indicated script in step 56 to generate an HTML document which is then returned to the Web browser as described before in step 58. After an HTML document is returned to the Web browser, processing continues at step 40. If the test of step 48 determines that the command is not a POST request then the server returns an error message to the Web browser in step 50, formatted as an HTML document. The processing continues at step 40 and the server again waits for the next request and the process repeats.

On-line services such as those described above are in high demand. Unfortunately, the task of developing an on-line service is currently one that almost always requires extensive programming skill and much specialized knowledge. There exists a great need for tools that will simplify the process of building an on-line service so that the process will take less time, be less error prone, and can be done by a nonprogrammer. In some cases, software tools exist to help convert the data content for the service from its native format to the format required by the server, but these tools only address the conversion of data files.

For example, in order to construct an on-line service for the World Wide Web, the service author performs a combination of the tasks, such as creating a new HTML document for hypertext included in the on-line service, creating a new script included in the on-line service, retrieving and modifying an existing HTML document from the Web server machine, retrieving and modifying an existing script from the Web server machine, and storing an HTML document or script on the Web server machine so that the Web server program will have access to it.

There are several approaches known in the prior art for constructing documents and scripts of an on-line service on the Web, and performing the tasks noted above. The first approach is that the service author runs a text or HTML editor program on the same machine as the web server to create or modify the on-line service documents and scripts that are stored on this machine.

The problem with the first approach is that the service author must be working at the Web server machine, or at least working at a terminal which is directly connected with the server machine. This is not always practical, because the service author may be at a location which is physically remote from the server machine. It also often happens that the server machine requires a high level of security because of the nature of the resources on the server machine that may be shared among a number of users. In this case access to the machine is often limited to the system administrators, and the service author may not have access to the machine for security reasons. For example, the only access to files used by the Web server may be through the Web server alone.

The second approach is that the service author may run a terminal emulation program on a client machine to establish a connection to the server machine over a network connection or a modem line. The terminal emulation program allows the user to run programs on the server machine as though the user were working directly on that machine, and with this arrangement the user runs a text or HTML editor program on the server to create or modify the on-line service documents and scripts as before.

The second approach has the problem that the server machine and client machine must both run additional programs to allow terminal emulation and remote execution of programs over a network. This adds to the complexity on both machines, and also requires that the service author be familiar with a terminal emulation program which typically has a difficult user interface that is not meant for nonexperts. This approach also adds another route from other machines to the server machine, which may be undesirable for security reasons. As with the first approach, the service author may not have access to the server machine for security reasons, or may not have authorization to write files to the machine.

In the third approach, the service author first transfers existing service documents and scripts from the server machine to a client machine either manually or via a network file transfer program. The author then runs a text or HTML editor program on a client machine to create or modify documents on that machine, and then transfers the completed documents back to the server machine either manually or via a network file transfer program, such as the file transfer protocol (ftp) or kermit, a file transfer method used with terminal emulation programs for communication over a modem.

The third approach is cumbersome because of the need for the separate steps of transferring the documents from the server back to the client, and transferring the documents back to the server after the editing is complete. This approach also has the security problems mentioned above for the other approaches.

Each of these three approaches also has the problem that the file names used for documents by a Web server are not always the same as the actual file names of the documents. An author of an on-line service will need to learn the mappings of file names to the URLs used by the Web server.

There is also the WorldWideWeb application, written by Tim Berners-Lee for use with a NeXT computer, that consists of a client browser program that is able to retrieve files from a Web server, and a client HTML editor that can edit the retrieved file. This program is not able to save the edited files to the Web server or otherwise manipulate information on the server. Instead, this approach is similar to the third approach discussed above in that a file transfer program is still needed to place the edited document back on the Web server. This approach also is not a complete solution for authoring an on-line service for the Web because the types of documents edited in this manner are limited to HTML documents which are not processed in any way by the server.

SUMMARY OF THE INVENTION

A general aim of the invention is to provide a client/server system, using a Web server, that allows for the creation and maintenance of an on-line service using a client system which remotely causes the server to perform operations required in the authoring process.

One of the difficulties in implementing a client system for creating and maintaining an on-line service on a Web server using HTTP is that, although existing Web servers, such as the CERN server and the NCSA server, have support for the HTTP PUT and POST methods, these existing servers still require development and installation of a script on the server to handle either PUT or POST methods.

Another difficulty in implementation is the choice of communication protocol for transferring information from client to server during the authoring process. Other problems may arise if a protocol other than HTTP is used. For example, other network services will need to be added, with ensuing security loopholes and added complexity.

Another difficulty in implementing a client system for creating and maintaining an on-line service over the HTTP protocol is that there are two or more types of component document objects for the on-line service that are stored on the Web server. These are HTML documents, and scripts that dynamically generate HTML documents upon request. If an authoring program would like to retrieve a script from the server, using the HTTP protocol, it cannot simply use the HTTP GET method that is normally used to retrieve documents and access scripts during the operation of an on-line service. The reason is that the HTTP GET method, when used to access a script, causes the script to be executed and returns an HTML document that is generated through execution of the script.

Another difficulty in providing a client system for creating and maintaining an on-line service in this environment is that a client program generally does not have a file name space that includes the file names of the document objects of the on-line service on the server. Such an overlap in the file name space generally requires use of a network file system. Creation of a network file system including the authors of all on-line services on a server is generally impractical. Such a system is also generally too complex to set up easily and requires too much close interaction among systems than is practical on a large heterogenous public network like the Internet. In many cases, a client authoring system would not have access to the server anyway to enable the set up of a network file system.

Yet another difficulty with Web server programs is that they are generally designed to make documents available only to browser, or read-only, programs which are concerned primarily about document content only. Other characteristics of documents useful in the creation and maintenance of an on-line service are not provided and are generally not accessible. Moreover, such information is often operating system and server program dependent.

The present invention overcomes these difficulties by providing a mechanism through which a client system remotely causes a server system to perform one of a collection of operations which support the creation and maintenance of an on-line service. Where the server is an HTTP server program, these operations may be performed by a server extension program that is called by the server program via the Common Gateway Interface (CGI). Alternatively, these operations can be implemented directly in the server program. The operations are invoked by the client system when the client sends a message to the server with an indication of the desired operation and the appropriate data content for the operation. Where the server is an HTTP server program, communication between the client and the server relies on HTTP. Results of the operations performed, or an error message, are returned to the client system from the server. In a Web client/server embodiment, the result or error from the operation performed by the server extension program is formatted into an HTML response message by the server program, or by the server extension program.

The operations which support creation and maintenance of an online service include at least both reading and writing of document objects. Additionally, other operations can be provided in combination with reading and writing operations to support a graphical user interface for a client application program. For example, operations which enable a user to list document objects of a service or to list the services available on the server may be provided. Operations to create, modify and otherwise maintain meta-information about a service and its document objects are also provided. Operations for creation of a document or service also may be provided. Generally, in this invention, a client application program can use such operations to create and modify information on a Web server for on-line services in a less burdensome fashion than the prior art.

To facilitate implementation of certain of such operations on the server side, more information than merely document objects may be provided on the server, including a set of meta- information. Such information can include service-level meta-information such as the server extension program version, time created, and values for macro variables that are common to many documents in the web, such as phone numbers, addresses and the like. Document-level meta-information may include the author, dates created and last modified, links to other documents, etc. This information is particularly useful for use in a graphical user interface in a client authoring application program, for example, to show types of document objects or how document objects in a service are interrelated. The server extension program, given the data content from the client and knowledge of the server and operating system environments, performs server or operating system specific operations to effect the operation requested by the client authoring system.

The implementation of these operations on the client side is preferably provided by having a client communication application programming interface (API) which handles all communication transactions with the server. This API has entry points, called by a client application program, that allow an end-user to perform the creation and maintenance operations. This API includes an entry point for each operation which the client authoring application program can invoke. The client authoring application program sets up a procedure to be called by the API when the results from the requested operation are received. The client application program may suspend operation or perform other tasks while the API handles transactions with the server which are necessary to perform the requested operation on the server.

Accordingly, one aspect of the present invention is a client/server system for authoring an on-line service on a server machine using a client machine. The client machine has an authoring tool for performing authoring operations on information comprising the on-line service. This tool generates requests for authoring operations to be performed on information on the server machine for authoring information on the server machine. These requests are translated into at least one message which is sent to the server machine. The server machine stores information authored using the authoring tool. The server machine also receives the message from the client machine and performs authoring operations identified in the received message so as to author information on the server machine. This information on the server machine is then made accessible by the server machine to other client systems that can be used to access the information without modifying the information, such as a browser. Generally, when the authoring client machine receives a response message from the server machine, it displays information about performance of the authoring operation by the server, using the response message.

In one embodiment of this invention, the client machine transmits messages by initiating a TCP/IP connection between the client machine and the server machine. An HTTP request message is constructed which has data, wherein the data content includes information identifying a type of transaction, parameter values for the transaction and a process to be invoked on the server to perform the transaction. This HTTP request message is sent to the server which processes the message to perform the authoring operation. The client machine may also detect reception of an HTTP response message from the server machine. Such a response message has data content carrying data generated by performance of the authoring operation. The client machine may display information about the authoring operation to the user. This HTTP response message may contain data content in a markup language, such as HTML. In such a case, the data content is parsed to obtain information requested from the server.

The authoring operations performed by this client/server computer system generally create or modify or store information on the server machine. For example, content of data files on the server can be modified. These data files may be document objects such as documents or scripts of the on-line service. They may also be other media data. The data files may also be meta-information about the on-line service. File information, such as access control information, can also be modified. Similarly, document objects or entire services can be created. Other operations, such as listing existing services or document objects of a service, also may be provided.

In this client/server computer system the authoring operations which can be performed may be provided and made available to a user or application programs as collection of primitive operations for authoring an online service. A basic operation to be used is saving a document object on the server. With this collection, each of the primitive operations is individually selectable by a user or application program. Such a collection may be called an application programming interface or API.

In another embodiment of the client/server computer system of this invention, where communication is performed using HTTP protocol over a TCP/IP connection, the server machine runs an HTTP server which receives HTTP request messages. When the server machine detects that a message contains a request for an authoring operation to be performed on information on the server computer, the server machine executes a process to perform the authoring operation via a common gateway interface. An HTML document is received as a result of performance of the requested authoring operation. This HTML document is transmitted to the client computer as a result of the requested authoring operation in an HTTP response message.

The client computer, after sending an HTTP request message, typically executes a process for detecting an arrival of an HTTP response message from the server machine. In response to detection of an arrival of the HTTP response message from the server machine by the executed process, another process is invoked for completing the authoring operation on the client machine. Such a mechanism can be used in an embodiment not limited to HTTP communication. This mechanism involves establishing a first process for detecting arrival of a response message from the server machine and for executing a second process for completion of the associated authoring operation on the client machine in response to detection of an arrival of a response message from the server machine. Until a response message is received from the server machine, the client machine can continue to perform operations which do not depend on results of the authoring operations performed on the server machine.

A particular difficulty overcome by embodiments of this invention is where the operating system of the client machine has a file name space which does not include or map to names of files on the server machine. This is typically the case in heterogenous networks such as the Internet and the World Wide Web. In such an environment, the server machine maps file names provided by the client machine into actual file names on the server. This environment allows authoring of an on-line service to be somewhat platform independent. In a particular embodiment of the invention, the authoring operations are performed on the server machine by a server extension program executed on the server computer by a server program via the common gateway interface, which allows additional platform and server independence. Alternatively, the server program itself can be implemented to perform these operations directly.

One advantage of this system is that current Web browsers do not need to be changed after installation of a server extension program at the Web server to permit use of the client system in accordance with this invention. This benefit is obtained in one embodiment by utilizing an HTTP method not used by the Web browser, the PUT method, to handle requests from the authoring tool. With this embodiment, changes to authoring tool systems can be made transparently to users who merely view information or use an on-line service. In another embodiment this benefit is obtained by using the HTTP POST method with a URL target used specifically for authoring. This URL may be disabled after the service is made available to the browser.

Another advantage of this system is that, by using the server extension program to handle authoring activity through a CGI mechanism, a standard HTTP server can be used without modification.

Still another advantage of this system over the prior art approaches is that the on-line service author can use a single client program and interface to retrieve a script or document from an existing on-line service on a server, edit or create a script or document for an on-line service, and save the resulting script or document to a known location for authoring on the server.

Another advantage of this system is that the author of an on-line service can create, modify or store on-line service documents, scripts and meta-information about the service or document objects from any client machine, so long as the client machine can communicate via HTTP protocol with the Web server that hosts the on-line service. The client machine and server machine may have different types of processors, with different architectures, running different operating systems, in a heterogenous network.

Yet another advantage of this system is that the client system communicates with the Web server program using the same type of network connection and the same protocol (HTTP) that is used by a Web browser talking to a Web server. This means that the remote editing facility of the invention will work from any client that can support a Web browser communicating with an on-line service. It also means that remote editing with this invention does not require any additional network connectivity programs other than those needed for a Web browser to communicate with a Web server.

Still another advantage of this system is that the authoring tool uses the basic authentication procedures provided by the HTTP protocol and the Web server software. Access to files on the server machine may be limited to service authors with a validated user name and password. Thus, by using the HTTP protocol that is already used for on-line services on the World Wide Web, some security is provided during the authoring process.

Another advantage of this system is that the authoring process can be used for remote retrieval, editing, and storing of at least two of the types of document objects that comprise an on-line service on the WWW: HTML documents and script programs that generate HTML documents. The system can also be used for retrieving and storing other types of document objects, such as images, video, audio or other media data, for part or all of a web document.

Remote authoring of online service document objects using the method of this invention also has several advantages over the prior art approaches, such as remote editing over a network file system where a client machine can read and write files on a remote server machine. One advantage is that this system allows access to the online service document objects only through the Web server program, and thus conforms to the additional security rules implemented by the server program. A second advantage is that since this system uses the existing HTTP protocol mechanism of the Web server machine, the server machine does not have to run additional software or server programs that are required to implement a network file system or shared access to a remote file system from a client machine. This is an advantage because the additional software would add complexity and would add further possibilities for security loopholes. A third advantage is that this system allows access to the online service document objects only through the Web server program, and thus conforms to the document object name mapping conventions between URLs and actual file names of the Web server program. Another advantage of this system is that neither client programs nor service authors need to understand this file name mapping and only need to use the URLs.

BRIEF DESCRIPTION OF THE DRAWING In the drawing.

FIG. 5A is an example document for a hierarchical file system including example file names and directory names for information maintained for an on-line service;

Figure 6A:
Figure 7:
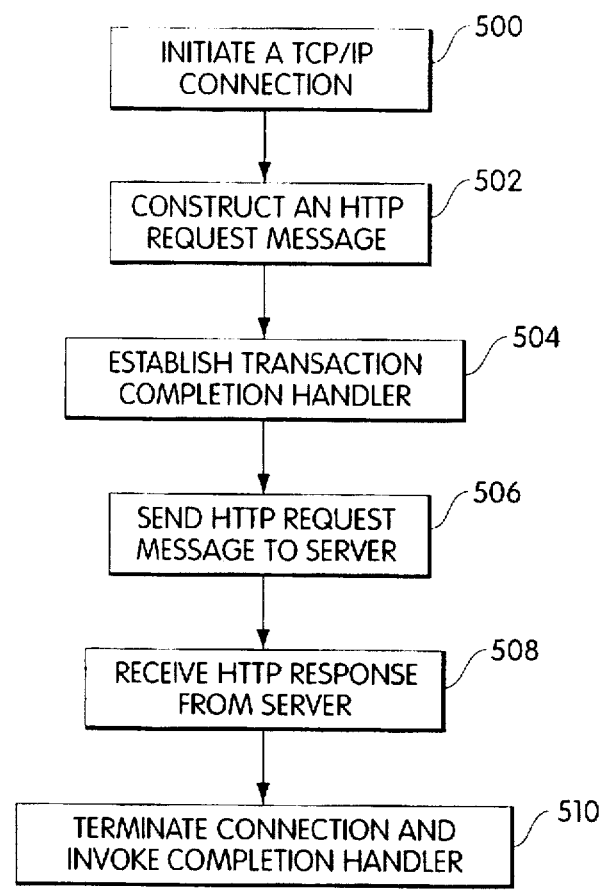
Figure 8:
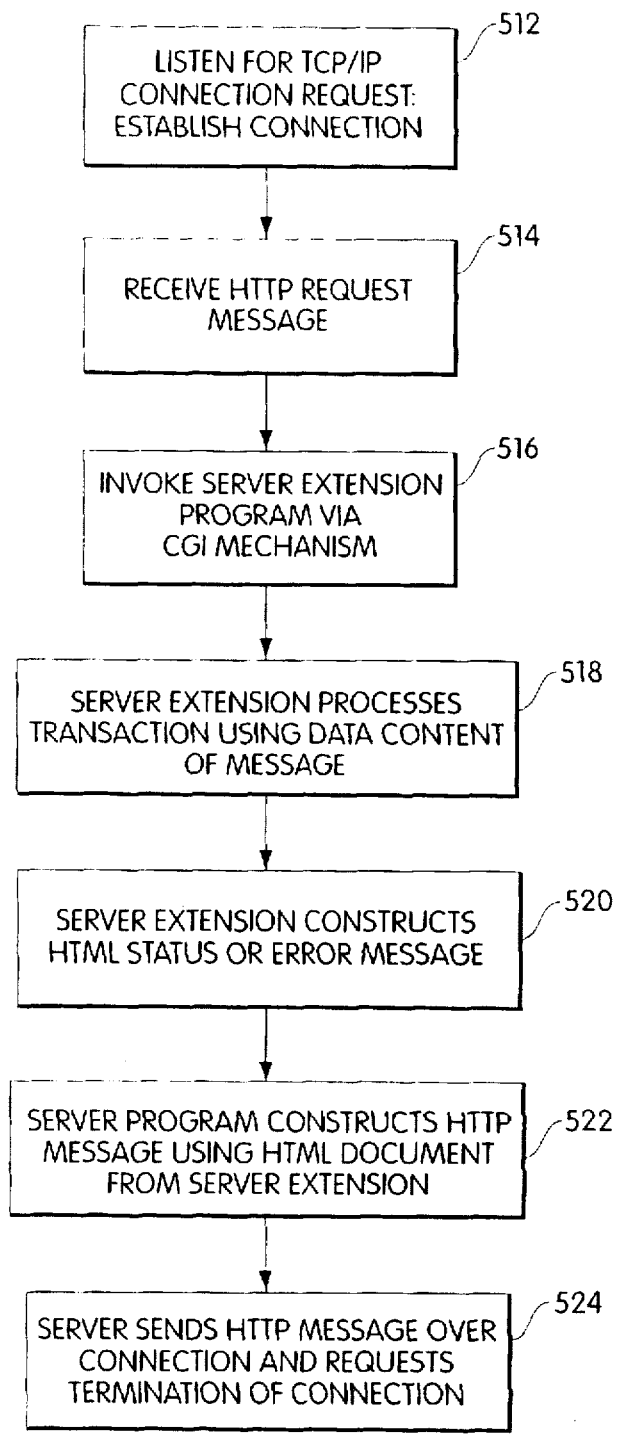

FIG. 5B further illustrates the example document for the hierarchical file system with example file names and directory names;

FIG. 5C also illustrates the example document for the hierarchical file system with example file names and directory names;

FIG. 5D is a further illustration of the example document for the hierarchical file system with example file names and directory names;

FIG. 5E is yet another illustration of the example document for the hierarchical file system with example file names and directory names;

FIG. 6A is an example HTML document used in an example on-line service;

FIG. 6B is an example document meta-information file in the example on-line service;

FIG. 6C is an example service or web meta-information file in the example on-line service;

FIG. 7 is a flowchart describing tasks performed by the client communication interface during a transaction;

FIG. 8 is a flowchart describing tasks performed by the server machine during a transaction;

FIG. 9 is an example HTTP request message in one embodiment of the invention; and FIG. 10 is an example HTTP response message in one embodiment of the invention.

DETAILED DESCRIPTION

The following detailed description of an illustrative embodiment of the invention is made by way of example only. It should be read in conjunction with the drawing, in which similar reference numbers indicate similar structures.

Figure 1:
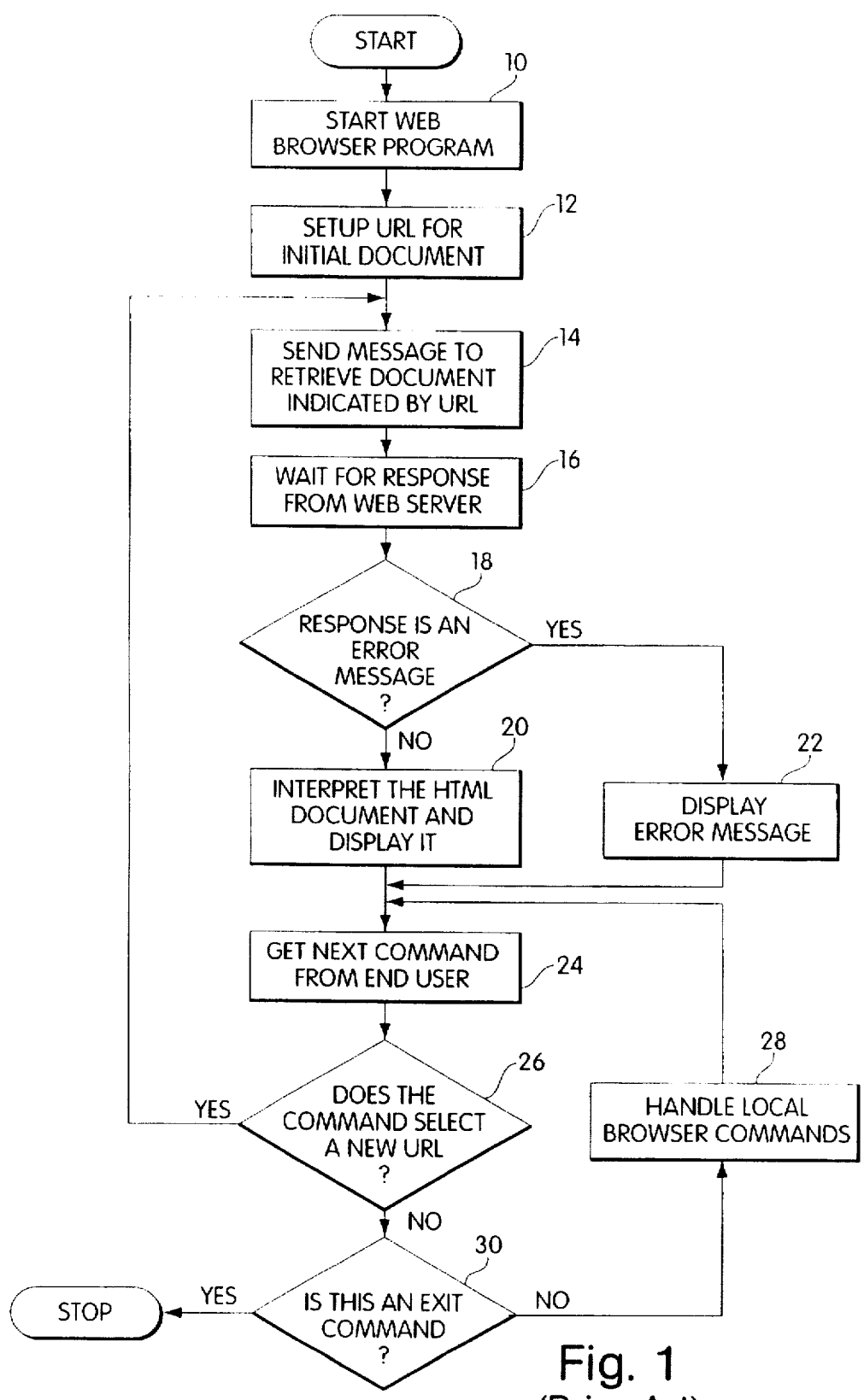
FIG. 1 is a flowchart describing a prior art sequence of activities on the Web browser during operation of an on-line service on the Web.
Figure 2:
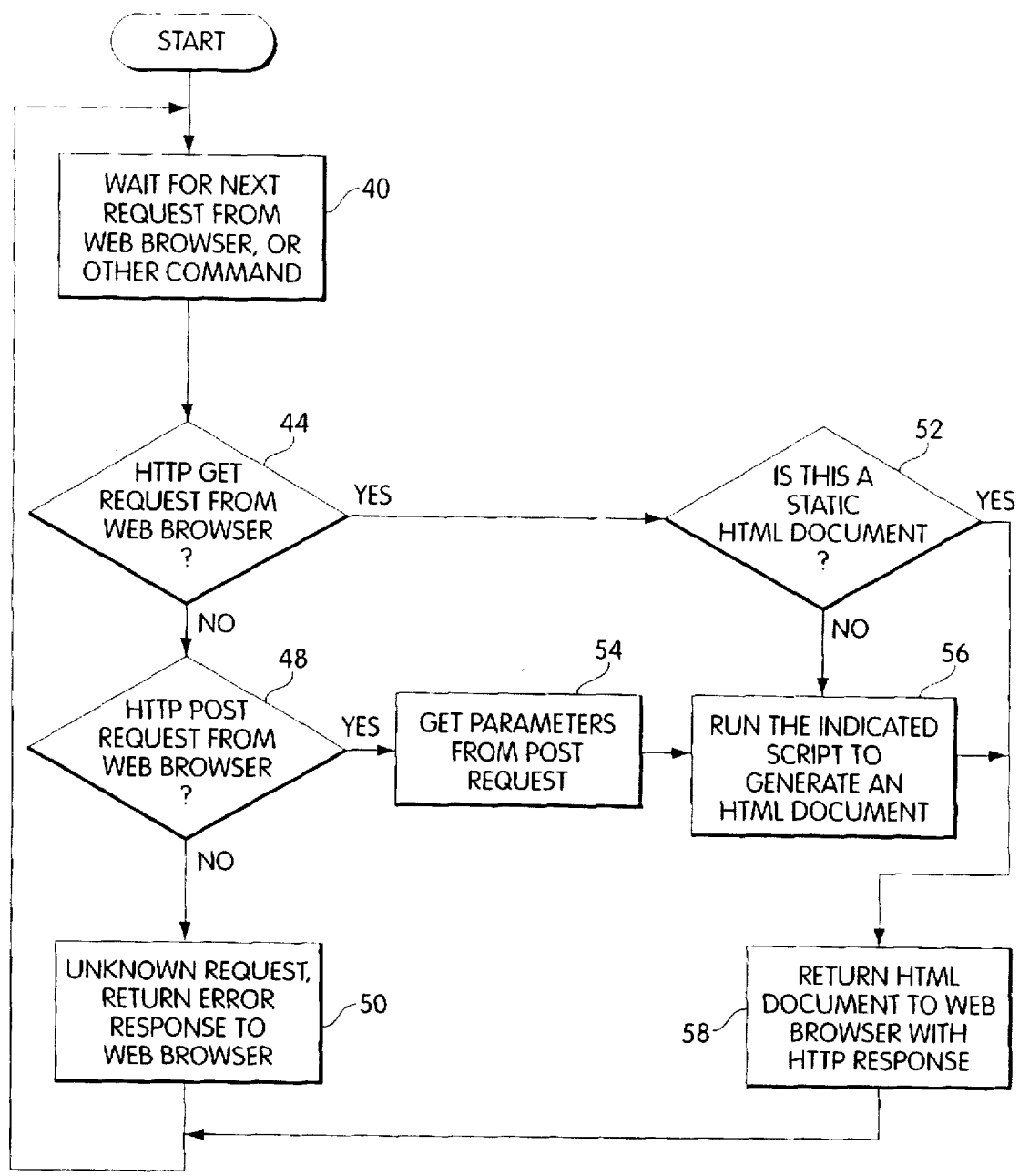
FIG. 2 is a flowchart describing a prior art sequence of activities on the Web server during operation of an on-line service on the Web.
Figure 3:
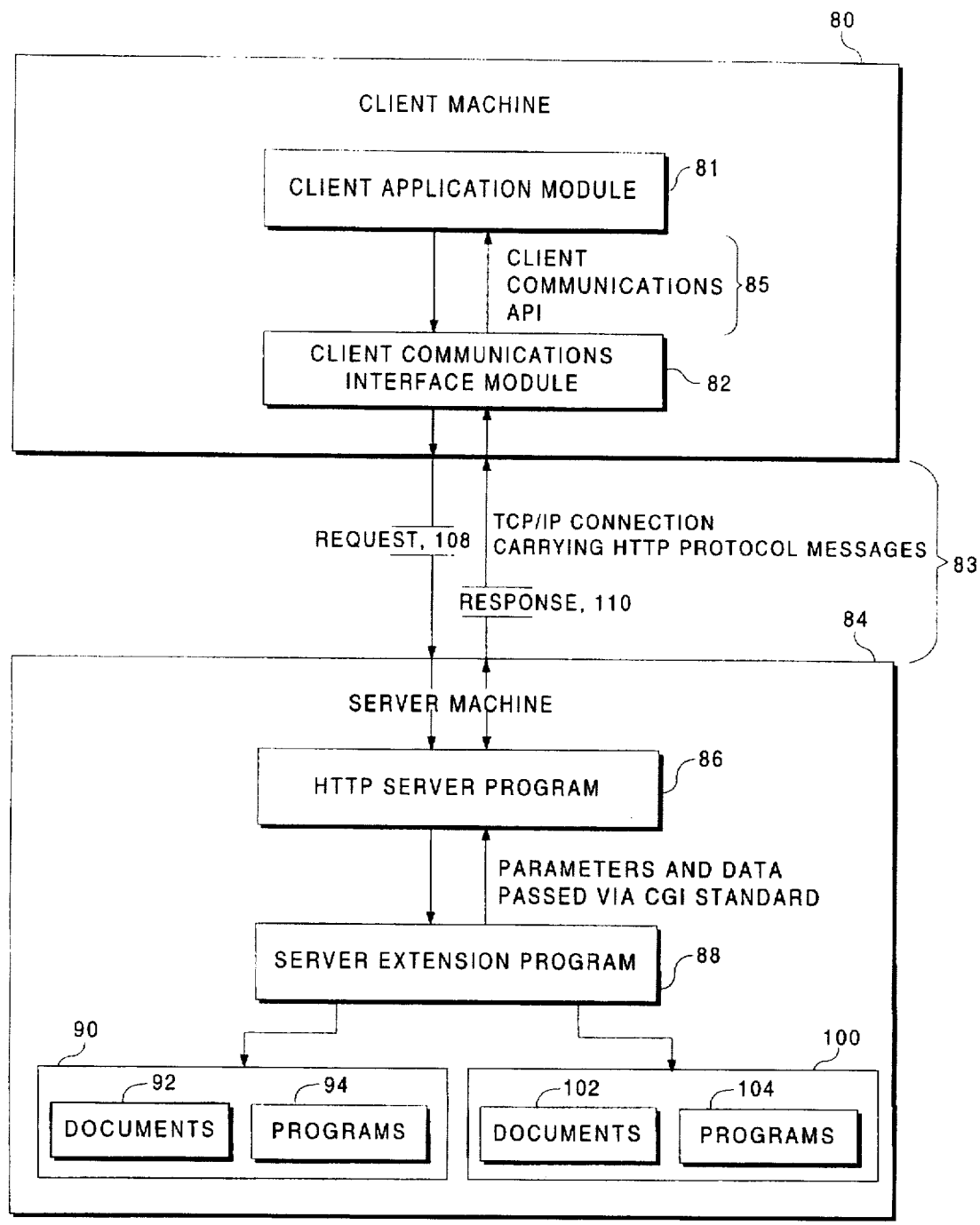
FIG. 3 is a block diagram illustrating the architecture of a system for creating and maintaining on-line services in accordance with the invention.

FIG. 3 is a block diagram of a computer system for creating and maintaining on-line services. The system includes a client machine 80 connected to a server machine 84 over a communication channel 83 through which the client sends requests 108 and receives responses 110. The client machine has a client communications interface module 82 which generates the requests 108 in response to requests, from a client authoring application module 81 executed on the client machine. These requests are made through a client communications application programming interface (API) 85 executed on the client machine. The server machine 84 executes a server program 86 which sends responses 110 to the client machine 80. The server program 86 has an associated server extension program 88 which, when executed by the server machine, processes requests 108 and generates the responses 110 to be returned by the server program 86. The server extension program 88, in response to some requests 108, may be used to access on-line services 90 and 100. These services may be created and maintained using the client application module 81 to generate appropriate documents 92 and 102 and programs 94 and 104. Generally speaking, the operating system executed on the client machine has a file name space which does not include or map to names of files on the server machine.

The client application module 81 presents a graphical user interface to the end user via a computer screen or display (not shown). The graphical user interface includes an interface for viewing a set of documents and the links between them, and an editing interface for editing a document. This graphical user interface uses standard techniques, including windows, menus, dialog boxes, and push buttons, that are accessed through the keyboard or through a pointing device. From this interface the user may request creation or modification or deletion of any documents within a given service or of the service as a whole.

From the graphical user interface, the user may also request an outline view of the web, a link map view of the web, and a document summary view of the web. The outline view starts with the home page document at the top level of the outline, and displays documents that the home page links to as subordinate to the home page document. In general, a given document has links to other documents that are displayed as subordinate to the given document in the outline, unless these other documents have been displayed elsewhere in the outline view. The link map view shows a starting document, all documents that the starting document links to, and all documents that link to the starting document. Each document is displayed as a graphical icon, and each link between two documents is displayed as an arrow from one document to the target document of the link. The link map view may also display further documents that are two or more links from the starting document, in the same manner. The document summary view of the web displays a list of all document objects in the web, and allows the user to sort the list by various characteristics, such as document type, author, title, or date created.

The user may also request modifications to auxiliary information, or meta-information, that is stored with the service, such as the name of a service, author information, date and time stamps, user names and passwords, access control information about a document or a set of documents, image or text files that are included by a document, image map information, information about a task list, and executable CGI programs or scripts. This information is provided in this invention as part of an on-line service. This information will be discussed in more detail below in connection with the description of FIG. 4.

For each user request that requires communication with the server, the client application module makes a call to one of the entry points in the client communications interface module.

Collectively these entry points are known as the client communications API. This API will be discussed in more detail below, and in connection with the description of FIGS. 7 and 8.

In one embodiment of the invention the client machine 80 is a PC with an Intel 80486 or better processor, running the Microsoft Windows 3.1 operating system. As discussed above, the client application module 81 may include any of a variety of document editors, such as HTML editors, text editors, script editors and the like. The exact form of the client application module and the functionality of the editor are up to the needs and desires of the user. However, in this embodiment of the invention such client application module allows the retrieval and storage of a document object on the Web server by generating an HTTP request message as described herein. Existing Web browsers could be modified to provide a storage function and editing capabilities to provide this functionality. Additionally, HTML and other editing tools may also be used in conjunction with this invention if modified to allow for retrieving and storing files on the server by generating appropriate HTTP messages as described below. A large number of HTML editors, such as HoTMetaL, from SoftQuad, Inc., of Toronto, Ontario, Canada, and other document editors and program editors, such as Microsoft Visual Basic may be used to create documents and scripts and the invention is not limited thereby. For example, the client machine 80 may have a dial-up connection to an Internet service provider, typically using a 14,400 baud or faster modem. It may use the Trumpet Winsock 2.0b application for Microsoft Windows, which is Winsock 1.1 compliant to provide a TCP/IP stack with a SLIP connection. In this arrangement, the client machine is connected to the Internet and has its own Internet address.

In this embodiment, the server machine 84 is a Gateway 2000 personal computer with an Intel Pentium processor or better running the BSDi Unix operating system. The Web server program 86 is the CERN Hypertext Transfer Protocol Daemon (HTTPD) server, configured for the Unix operating system. The server machine 84 also has a dial-up connection to an Internet service provider, using a 14,400 baud or faster modem, and using the TCP/IP and SLIP software that comes with the BSDi Unix operating system. Generally speaking, the Web server program is the only program providing access to documents and scripts of an on-line service, other than the operating system. It may define groups of users, user names, passwords and file names separately from the operating system of the server machine 84. With this configuration the client and server machines can establish a TCP/IP connection and exchange messages over the Internet.

It should be understood that this embodiment is merely exemplary. A large variety of computers and operating systems have suitable server and client software for communicating using HTTP over the Internet. The client and server machines may also be connected by a local area network (LAN), wide area network (WAN) or may even be the same machine, but with different processes communicating together over a common communication channel.

Additionally, a special-purpose computing system may be used to implement the invention, rather than a commercially-available computer. Although communication is generally provided over a TCP/IP connection, other network communication protocols, including other data transport protocols and message protocols may be used. A variety of message protocols for communicating over TCP/IP connections may be used, such as HTTP, FTP, telnet, etc. However, generally speaking, the server and the client do not share files through the file name spaces of their respective operating systems. That is, the file name space of the client does not include or map to names of files on the server. In other words, no pair of file names in the two file names spaces corresponds to the same file. More details about setting up client and server machines connected to the Internet and the World Wide Web are discussed in "Setting up Shop on the Internet," by Jeff Frentzen et al., and related articles in *Windows Sources*, February 1995, pp. 42, 64–67, 70, 73–74, 77–80, 106, 108, 111, 113–114, 117–120, 122, 125, 128, 134–136, 138–140 and 143, and in *How to Set Up and Maintain a Web Site*, by Lincoln D. Stein, Addison-Wesley, August 1995.

Figure 4:
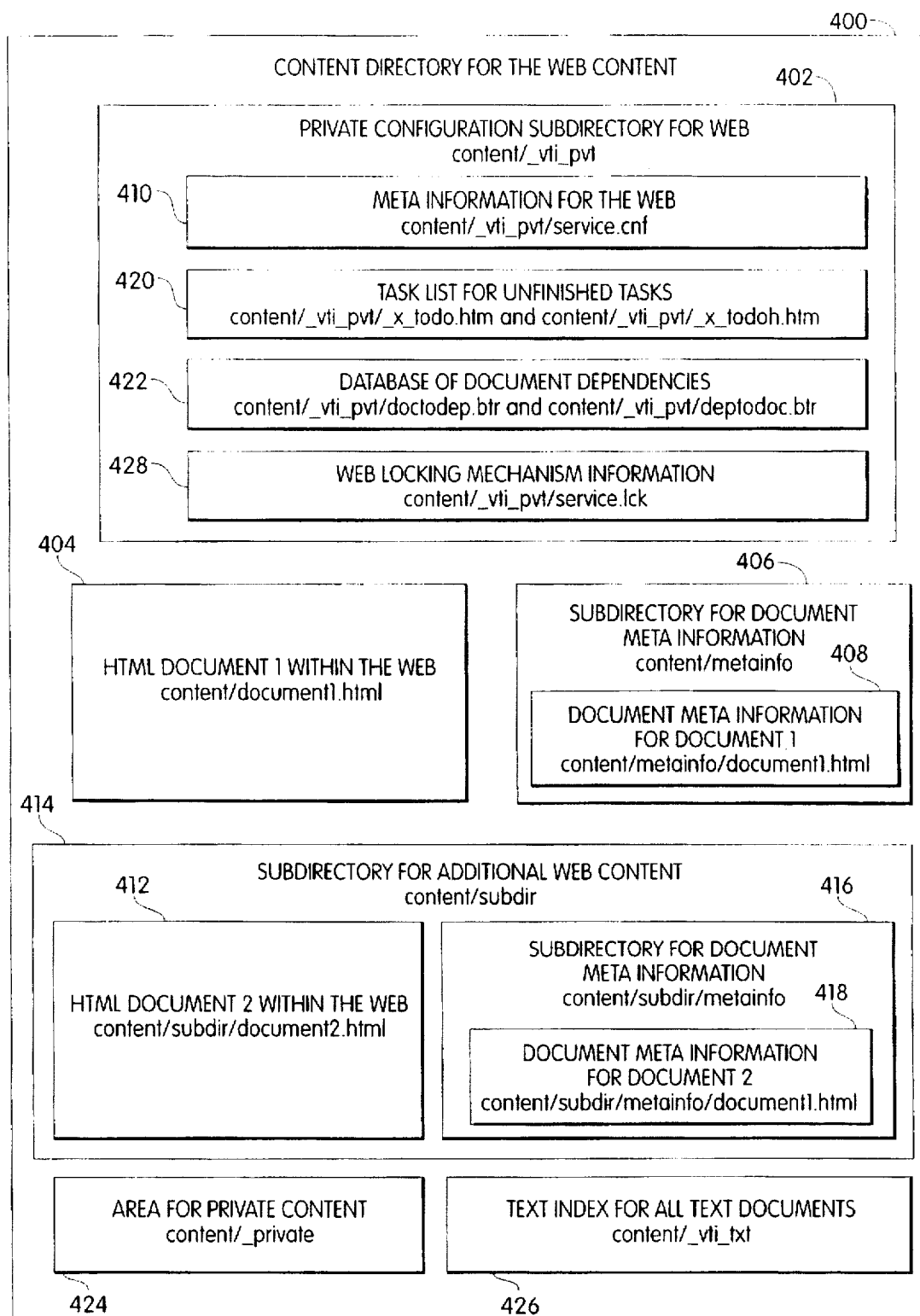
FIG. 4 shows a block diagram of how Web information is stored in this invention.

An online service, as used in this application, also called herein a "web", is a set of document objects and associated informnation, stored on a server machine. The documents in the web share certain access control characteristics that are common to the web. The web itself has a URL, and each document in the web has a URL that starts with the web URL. The organization of web information in one embodiment is shown in FIG. 4. This embodiment uses a hierarchical file system.

Referring now to FIG. 4, each web or service has a location 400 on the server where all the document objects and associated information of the web is stored. In the illustrated embodiment, the server has a hierarchical file system and the web location is a directory, called the "content" directory, within this file system. All documents and information associated with the web are stored within the file hierarchy based at this directory.

Another location (not shown) on the server is also used to store the type of HTTP server that is used for the web, the port number associated with the HTTP server, and the location of the configuration information for the server. In one embodiment these are stored at a globally known location within the file system, such as a predefined subdirectory and file in the file system.

HTML documents, image files, and other content files that make up the web are also stored individually in a location 404 on the server. This content will be accessible to the end user of the web using a web browser. Similarly, such content files may be stored at a location 412 in another subdirectory 414 in the file system. This is useful, for example, to provide a separate directory for different types of content files.

Meta-information, or information about information, is also stored. First, document meta-information, or information about a particular web document object, such as the title of the document, the author of the document, the date and time that the document was created, and the date and time that the document was last modified, may be stored in another location 406 on the server. The document meta-information may also include a list of hypertext links from the document to other document objects. In this embodiment, a separate subdirectory of the directory containing the document is provided. In this subdirectory, a file 408 containing meta-information for a content file is stored for each content file using the file name of the content file to which it corresponds. In a subdirectory of additional web content, e.g. subdirectory 414, an additional subdirectory 416 may also include the meta-information files 418 for corresponding content files 412.

Second, web meta-information, or information about the web as a whole, such as the date and time that the web was created, the version of the server extension program that was used to create the web, and the version of the HTTP server program is stored at a location 410 on the server. The web meta-information also may include the values of some common parameters that are used throughout the web, such as the name and address of the company represented in the web. Parameter values indicating settings of options are also stored in the web meta-information, for instance a parameter value indicating whether this web uses case sensitive URLs or not.

Information on the web locking mechanism may also be stored in the configuration subdirectory 402 or other known location for the web such as shown at 428. This information is used to implement a locking mechanism so that the system will correctly handle multiple authors accessing or modifying web information at the same time. Web server specific access control information about each web may also be included, such as list of users and their passwords, definitions of groups of users, and a list of users and groups that may access the web or a particular part of the web. This access control information can also be stored in directory 402 or another known location.

A web may also contain other information. For example, a task list 420 of unfinished tasks can be used to guide the web author during creation and maintenance of a web. A database 422 of document dependencies for the web can be stored to provide information about which documents a given document depends on. This database is used to decide when a change to one document should cause a second document or meta information for the second document to be updated. An area 424 for private content that will not be accessible to the end user with a web browser can also be provided. This is used for content that may be included by several documents within the web but that should not be directly accessed. A text index 426 for all text documents contained in the web can be provided for use for text searches of all the documents in the web. An area for CGI programs and scripts that implement the server extensions of this invention should also be allotted. Similarly, an area for custom CGI programs and scripts that are created by an author may be provided.

FIGS. 5A–5E show an example of the information stored about a web, in one embodiment where the server machine is a Sun SparcStation 20 running the Sun Solaris 2.4 operating system, and the server program is the NCSA HTTP server, version 1.3R. FIGS. 5A–5E show a list of documents found in particular subdirectories, and lists the files that store information about the example web. It also identifies each of the files as belonging to one of the classes of web information discussed above. In this example the web is a "corporate presence" web that has been created by the client/server authoring system of this invention. The web location or content directory is "./content/", where "." denotes some arbitrary starting point within the hierarchical file system. Each service may be organized as a subdirectory of this "content" directory. A default service in the "content" directory is shown in FIGS. 4 and 5A–5E.

The format for some of the files that are stored in the "corporate presence" web on the server machine will now be described with reference to FIGS. 6A–6C. These files are in essence data structures used by the server program and the server extension program.

The document content files are stored as HTML, for example, according to the standard rules of the HTML 2.0 language. Image content files are stored in one of the standard image formats, including the GIF 87, GIF 89A, and JPEG image formats. FIG. 6A shows the format of one of the document content files, named "content/pr01.htm", in the HTML language.

A document meta-information file is shown in FIG. 6B. Generally, document meta information files store pairs of text strings, where each pair contains a text string for the name of an attribute, and a text string giving the value of the attribute. Each pair is stored as one line of a text file, with each line containing the attribute name, followed by a colon (":") as separator, followed by the attribute value. FIG. 6B shows the format of the document meta information file, named "content/metainfo/pr01.htm", that stores further information about the document content of FIG. 6A. As one example of the document meta information, the attribute named "vti_title" has the value "SR|Zephyr Press Release 1", indicating that the title of this document is "Zephyr Press Release 1". The optional characters before the '|' symbol at the start of the attribute value indicate further information about the format of the value. For example, an attribute value starting with 'S' represents a text string; a 'T' indicates a time value; and 'I' indicates an integer value.

The attribute "vti_cachedbasedtm" gives the date and time of last modification to any of the cached attribute values, in this case "19 Nov. 1995 10:47:2 EST". The attribute "vti_cachedtitle" gives the document title, in this case "Zephyr Press Release 1 ". The attribute "vti_cachedtitledtm" gives the date and time of last modification to the "vti_cachedtitle" attribute value, in this case "19 Nov. 1995 10:47:50 EST". The attribute "vti_cachedlinkinfo" gives the list of documents that this document links to, in this case the first link is to "images/logo.gif". The attribute "vti_cachedlinkinfodtm" gives the date and time of last modification to the "vti_cachedlinkinfo" attribute value, in this case "19 Nov. 1995 10:47:42 EST". The attribute "vti_extenderversion" gives the version number of the server extension program, in this case "1.0.3.3". The attribute "vti_timelastmodified" gives the time at which the document was last modified, in this case "19 Nov. 1995 10:47:33 EST". The attribute "vti-timecreated" gives the time at which the document was created, in this case "19 Nov. 1995 10:47:33 EST". The attribute "vti_author" gives the name of the author who created the document, in this case "username". The attribute "vti_modifiedby" gives the name of the author who last modified the document, in this case "username".

A web meta-information file is shown in FIG. 6C. Generally, web meta information files store pairs of text strings, where each pair contains a text string for the name of an attribute, and a text string giving the value of the attribute. Attribute name value pairs are stored as in document meta information files. FIG. 6C shows the format of a web meta information file, named "content/_vti_pvt/service.cnf" that corresponds to the example of FIG. 6A. As one example of the web meta information for this web, the attribute named "vti_timecreated" has the value "TR|19 Nov. 1995 10:46:41 EST", indicating that this web was created on 19 Nov. 1995 at 10:46 AM EST. The following describes the other attributes stored with the web meta information in this example.

The attribute "vti_httpdversion" gives the version of the web server program, in this case "NCSA/1.3". The attribute "vti_extenderversion" gives the version of the server extension program, in this case "1.0.3.3". The attribute "vti_timecreated" gives the date and time that this web was created, in this case "19 Nov. 1995 10:46:41 EST". The attribute "vti_welcomenames" gives the default welcome file name for the server, in this case "index.html". The attribute "vti_casesensitiveurls" indicates whether URLs are case sensitive for this server, in this case the value is "1", meaning yes. The attribute "vti_restartmanual" indicates whether the user must manually restart the server after creation of a web, so that the server can reread its configuration file. In this case the value is "0", meaning that manual restart is not needed. The attribute "vti_autorecalc" indicates whether the server extension program must automatically recalculate document dependencies after a document object is saved to the server. In this case the value is "1", meaning automatic recalculation is enabled. The attribute "vti_longfilenames" indicates whether the server operating system uses long file names, in this case the value is "1" meaning that long file names are used. The attribute "vti_htmlextensions" gives a list of file extensions that will indicate that a document file is HTML, in this case the list consists of the three extensions ".html", ".htm", and ".htm". The attribute "vti_textextensions" gives a list of file extensions that will indicate that a document file is text, in this case the list consists of the extension ".txt". The attribute "companyemail" gives a macro variable for the company email address, in this case "info@zephyr.com". The attribute "companylongname" gives a macro variable for the long form of the company name, in this case "Zephyr Autowerks". The attribute "companyshortname" gives a macro variable for the short form of the company name, in this case "Zephyr". The attribute "companyphone" gives a macro variable for the company phone number, in this case "517-890-1000". The attribute "companywebmaster" gives a macro variable for the email address of the company webmaster, in this case "webmaster@zephyr.com". The attribute "companyaddress" gives a macro variable for the company address, in this case "123 Piston Drive, Midland, Mich. 48640". The attribute "companyfax" gives a macro variable for the company fax phone number, in this case "517-890-1001".

Given the structure as described above, the present invention allows a client system to remotely perform operations on document objects and associated meta-information of a web by communication with the server program. This communication and the performance of exemplary authoring operations will now be described in connection with FIGS. 7 and 8. .

Communication between the client application module 81 on the client machine and the server program 86 on the server machine can occur when both machines are connected to their respective Internet service providers or other system providing an equivalent connection. For example, the client and server machines may be the same machine, or on different machines, and in either case a TCP/IP stack program is used to provide a communication path between the client communications interface module and the server program. Communication between the server machine and client machine takes the form of the client sending an HTTP request 108 to the server, the server processing the request, followed by the server replying with an HTTP response message 110 to the client. In order to accomplish this, the client communication interface module 82 establishes a TCP/IP connection to the server program 86 and sends the HTTP request message 108 over that connection. The server program 86 receives the HTTP request message 108, performs the indicated processing, and replies with an HTTP response message 110 over the same connection. Finally the two programs terminate the TCP/IP connection.

In this embodiment, when a particular HTTP request message (such as a POST message) is received by the server program 86, the server program executes the server extension program 88, for example, in the C++programnming language. It should be understood that other protocols, such as FTP could also be used. Different protocols and different messages could be used for both retrieval and storage. For example, FTP could be used to retrieve and HTTP could be used to store, or vice versa. Generally speaking, in this embodiment of the invention, the same type of message is used to process both retrieval and storage of both documents and scripts. The particular message type is not limiting of this invention. The server extension program handles requests to retrieve or store objects in the service data areas 90 and 100 on the server machine. There are generally two types of objects stored in each service data area: documents in the HTML language 92 and 102, and script programs that generate HTML documents 94 and 104.

In this exemplary embodiment of the invention all communication from the client to the server is initiated through one of the entry points of the client communications interface module API 82. Table I provides a list of procedures in an API which are most useful in an authoring tool.

TABLE I

| | |
|---|---|
| GetDocument | Retrieve one document from the server, and return the document to the client application module. |
| PutDocument | Save one document to the server machine. |
| CreateService | Creates a new, empty web. |
| ListServices | Return a list of webs on a given port of a given server. |
| ListDocuments | Return a list of documents in the web, including lists of links for each document. |
| SetServiceMetaInfo | Modify the meta information about a web that is stored on the server machine. |
| SetDocumentMetaInfo | Modify the meta information about a document object that is stored on the server machine. |

The client communications interface module implements each of the procedures that collectively make up the client communications API. Each procedure initiates one or more transactions between the client and the server, where a transaction consists of an HTTP request sent from the client to the server, followed by a HTTP response message returned from the server to the client.

Before initiating the transactions for a given API call, the client communications interface module 82 sets up a procedure such that completion of all transactions for this API call triggers a call to the procedure. This procedure performs any tasks associated with the completion of the API call. One of these tasks is usually to give the user an indication through the graphical user interface that the user request has been processed.

Each client/server transaction follows the same general model. Table II is a list of transaction types used by the foregoing API calls. For each transaction, in turn, the client communication interface 82 performs the following tasks, as described in connection with FIG. 7.

TABLE II

GET_DOCUMENT
PUT_DOCUMENT

TABLE II-continued

CREATE_SERVICES
LIST_SERVICES
LIST_DOCUMENTS
SET_SERVICE_METAINFO
SET_DOCUMENT_METAINFO
SERVER_VERSION

First, the client communications interface module 82 initiates a TCP/IP connection between the client and the server in step 500. Messages in the HTTP protocol will be sent and received over this connection. In the preferred embodiment of the invention a separate TCP/IP connection is established for each transaction. Next, in step 502 the client communications interface 82 constructs an HTTP protocol POST request message, where the data content of the message carries information identifying the type of transaction, and parameter values or data specific to that type of transaction. The message format is an HTTP message where data needed for the transaction is Forms URL encoded, using key, value pairs. Data content of a put_document transaction follows the key, value pairs. FIG. 9 shows an example of the format of an HTTP POST request, in this case a POST request for a PUT_DOCUMENT transaction. The message consists of eight HTTP header lines, followed by a blank line, followed by the URL form encoded parameter values, followed by a blank line, followed by the HTML document content. Optionally, the data content of the HTTP protocol POST message can be encrypted.

The URL transmitted with the POST message identifies a program that will be invoked on the server machine in order to perform the request. The client communications interface 82 then sets up a mechanism (step 504) whereby the arrival of an HTTP response message will trigger a call to a procedure that will handle the completion of the associated transaction on the client system.

After completion of these preliminary setup tasks, the transaction with the server is initiated by sending the HTTP protocol POST request message (step 506). Until the client communication interface module receives a corresponding HTTP protocol response message, the client computer may continue to do other tasks that do not depend on the results of the transaction. The client eventually receives an HTTP response message from the server in step 508. The HTTP response message may contain status information or data in response to the client request, or it may contain an error indication if the client request could not be satisfied. FIG. 10 shows an example of the format of an HTTP response message, in this case the response to a POST request for a PUT_DOCUMENT transaction. The message consists of four HTTP header lines, followed by a blank line, followed by the returned status information and meta information for the document. The document meta information consists of attribute name value pairs in HTML format. After the response is received, the client communications interface module then requests termination of the TCP/IP connection for this transaction, then invokes the mechanism established to complete the associated transaction (step 510).

If the transaction requires authentication from the authoring client, then the transaction tasks are performed in the same manner, except that the HTTP protocol response message will contain an error message indicating that the client must authenticate the transaction by sending a user name and password. This authentication process is part of the HTTP protocol. The client program requests the user name and password from the user, and the tasks described are repeated with another TCP/IP connection, where the HTTP POST message carries the user name and password in addition to the original parameters.

Operations on the server machine will now be described in connection with FIG. 8. According to well known techniques, the HTTP server program listens for TCP/IP connection attempts from client machines (step 512). In response to a connection attempt the server program performs the necessary tasks to set up a connection. When an HTTP protocol POST message is received over this connection (step 514), the server program invokes the requested program in step 516, passing parameter information according to the CGI standard mechanism. In the method of our invention, the program that is invoked by the server is a "server extension" program 88. It should be understood that the server extension program may be implemented as one or several programs.

When the server extension program is invoked, it reads the parameters and data content of the HTTP protocol request message that were passed in according to the CGI protocol. The server extension program parses the message to determine the transaction type and parameters specific to the transaction, and performs the task indicated by this transaction (step 518).

If the task is performed successfully, the server extension program constructs (step 520) a status message, formatted as an HTML document, indicating that the transaction task was performed successfully. The message also includes any associated data that must be returned to the client for this transaction. If the transaction task was not performed successfully, then the server extension program constructs (step 520) an error message, formatted as an HTML document. In any event, the resulting message is returned to the server according to the CGI standard technique, and the server extension program terminates.

When the server program receives the status or error message from the server extension program, the server program constructs, in step 522, an HTTP protocol response message containing the HTML document produced by the server extension program, and sends it over the TCP/IP connection to the client communications interface module. The server then requests termination of the TCP/IP connection in step 524.

There are several possible variations in the mechanisms described above. In one variation the TCP/IP connection is kept open for more than one transaction, to reduce communication overhead and increase performance. In another variation, one invocation of the server extension process handles more than one transaction.

Each of the procedures of the client communications API follows the general description given above. The server extension tasks performed by certain transaction types, namely the "GET_DOCUMENT", "PUT_DOCUMENT", "CREATE_SERVICE", "LIST_SERVICES", "LIST_DOCUMENTS", "SET_SERVICE_", and "SET_DOCUMENT_METAINFO" transaction types, will now be described.

The client authoring tool calls the GetDocument API procedure to retrieve a document and the associated document meta information from the server machine. The procedure initiates the GET_DOCUMENT transaction to retrieve the document and associated meta information from the server.

When the server extension program on the server receives a GET_DOCUMENT transaction, the following steps are performed. First, the indicated document is retrieved on the server machine. Then the document meta information is retrieved for this document.

An HTML document containing either a status message with the retrieved document and document meta information, or an error message, is then constructed. This document is returned as the response to the server program which in turn sends it to the client communication interface module as described earlier.

The client application program calls the PutDocument API procedure to save a modified document to the server machine. The procedure initiates a PUT_DOCUMENT transaction to save the modified document to the server. The request message generated for the transaction includes an indication of a location on the server (URL) and the content of the modified document.

When the server extension program on the server receives a PUT_DOCUMENT transaction, the program performs the following tasks. First, the transaction request is parsed into parameter values and data content. The data content is then stored in the indicated document location on the server machine. The data transmitted with the transaction is the new content of the HTML document, or in the case of other types of document objects, such images, scripts, video or audio, is the new content for the document object. The document meta information file associated with the saved document is then located. In one embodiment, the document meta information is stored in the "metainfo" subdirectory of the document's directory, under the same name as the saved document.

The document meta information file is updated as follows. The value of the "vti_timelastmodified" attribute is changed to the current time, to indicate the time at which the document was last modified. The value of the "vti_modifiedby" attribute is changed to the user name of the author who requested that the document be saved to the server machine. The value of the "vti_cachedlinkinfo" attribute is changed to be the current list of documents or images that the current document either includes or has links to, so that the list reflects any additions or deletions of links in the new version of the document. The value of the "vti_cachedlinkinfodtm" attribute is changed to the current time, to indicate the time at which the value of the "vti_cachedlinkinfo" attribute was last updated. The value of the "vti_title" and "vti_cachedtitle" attributes are changed to the current document title. The value of the "vti_cachedtitledtm" attribute is changed to the current time, to indicate the time at which the value of the "vti_cachedtitle" attribute was last updated. The attribute "vti_cachedbasedtm" is changed to the current date and time, indicating the most recent modification to any of the cached attribute values. The attribute "vti_extenderversion" is changed to the version number of the server extension program. The attributes "vti_timecreated" and "vti_author" are not changed, since these give information about the creation of the document. New attribute key value pairs are added to or updated in the document meta information file for any new attribute information that was received with the transaction.

After meta-information is updated, the document dependency database and the text index of all documents in the web are both updated to reflect the changes in the saved document. The task list of unfinished tasks is also updated to reflect any new tasks that were generated as a result of the changes to the saved document. An HTML document containing either a status message and the document meta-information, or an error message is then constructed and returned as the response to the server program. The server program in turn sends the response to the client communication interface module as described earlier.

The client authoring tool calls the CreateService API procedure to create a new web on the server machine. If necessary, this procedure initiates a SERVER_VERSION transaction to retrieve the version number of the server extension programs in order to check compatibility between the client author program and the server extension programs. The procedure then initiates a CREATE_SERVICE transaction to create the new web on the server.

When the server extension program on the server receives a CREATE_SERVICE transaction, the program performs the following tasks. A content directory for the new web and a "metainfo" subdirectory of the content directory, for storing document meta information files associated with documents in the content directory, are both created. The file that stores the web meta information for the new web is created and the value of the "vti_timecreated" attribute in that file is set to the current time, to indicate the time at which the web was created. The attribute "vti_extenderversion" is set to the version number of the server extension program. The attributes giving macro variable definitions for company information, such as "companyphone", are set to their initial values as specified by the authoring client user through the graphical user interface. Other attributes are set to initial values that are appropriate for the given server machine and HTTP server program. The meanings of these attributes have been described earlier. Web server specific access control information about the new web is also created through internal routines of the server extension program that are specific to the type of web server. These internal routines are server-specific because server access control information is stored in different ways for different servers.

Mappings in the web server configuration information for the new executable directories associated with this web are then created. This is done through internal routines of the server extension program that are specific to the type of web server, because server configuration information is stored in different ways for different servers. These mappings direct the server to map a particular set of URLs (those with a common prefix of the URL for this web) to the physical location of the web content files on the server machine (the web content directory). For example, when creating a web on a NCSA server, the server extensions use a NCSA specific internal routine to add the lines listed in Table III to the NCSA server configuration file "srm.conf". These lines indicate that four directories on the sever machine are marked as containing CGI programs or scripts, and furthermore defines the URLs to be used when accessing these programs or scripts.

An initially empty area for private content of the web, an initially empty text index for the new web, an initially empty document dependency database for the new web and an initially empty task list of unfinished tasks for the new web are then all created. The name of the new web is then added to the file that stores the list of all webs associated with this server.

An area for CGI programs and scripts that implement the server extensions of this invention is created and any necessary CGI programs and scripts are copied to this area. Similarly, an area for custom CGI programs and scripts that are created by an author is also created.

File system access permissions on each file in the web are then set to complete this operation. Upon completion of the operation, an HTML document containing either a status message containing the web meta information for the newly created web, or an error message is then constructed. This document is returned as the response to the server program which in turn sends it to client communication interface module as described earlier.

The client authoring tool calls the ListServices API procedure to retrieve a list of all webs on the server machine. If necessary, this procedure initiates a SERVER_VERSION transaction to retrieve the version number of the server extension programs in order to check compatibility between the client author program and the server extension programs. The procedure then initiates a LIST_SERVICES transaction to retrieve the list of all webs on the server machine.

When the server extension program on the server receives a LIST_SERVICES transaction, the program performs the following tasks. The file that stores a list of all webs associated with this server is read to obtain the list. An HTML document containing either a status message with the list of webs, or an error message is then constructed. The HTML list format can be used with each web name as a list item. The constructed HTML document is then returned as the response to the server program which in turn sends it to the client communication interface module as described earlier.

The client authoring tool calls the ListDocuments API procedure to retrieve a list of all documents in a given web on the server machine, and to retrieve for each document a list of links from that document to other documents. The procedure initiates a LIST_DOCUMENTS transaction to retrieve the list of all documents in the given web on the server machine, and to retrieve for each document a list of links from that document to other documents.

When the server extension program on the server receives a LIST_DOCUMENTS transaction, the program performs the following tasks. Starting with the content directory for this web, a recursive tree traversal algorithm is used to identify each document in the file hierarchy for this web. These documents may be HTML documents, text documents, or images. For non-HTML documents, such as images, a document record is formatted containing the name of the document.

For each HTML document identified, the following steps are performed. First, the document meta information file

TABLE III

| | |
|---|---|
| ScriptAlias/corporate/_vti_bin/_vti_adm/ | /content/corporate_vti_bin/_vti_adm/ |
| ScriptAlias/corporate/_vti_bin/_vti_aut/ | /content/corporate/_vti_bin/_vti_aut/ |
| ScriptAlias/corporate/_vti_bin/ | /content/corporate/_vti_bin/ |
| ScriptAlias/corporate/cgi-bin/ | /content/corporate/cgi-bin/ | associated with this document, as described earlier, is located. This file is read to get the list of links from this document to other documents. The attribute "vti_cachedlinkinfo" is used to obtain the list of links. If the list of links is unavailable or out-of-date, then the list of links may be computed by parsing the HTML document. A document record for this document is then formatted which contains the name of the document and a list of included documents or links to other documents.

An HTML document containing either a status message with all of the document records, or an error message, is then constructed. This document is returned as the response to the server program which in turn sends it to the client communication interface module as described earlier.

The client authoring tool calls the SetDocumentMetainfo API procedure to modify the meta information about a web that is stored on the server machine. The procedure initiates a SET_SERVICE_METAINFO transaction to modify the meta information about a web that is stored on the server machine.

In response to such a transaction request, the server extension program locates the web meta information file associated with this web. In one embodiment, the web meta information is stored in the file "service.cnf" in the private configuration subdirectory of the web content directory. The contents of the web meta information file are modified to reflect the new attribute key value pairs contained in the SET_SERVICE_METAINFO transaction request. An HTML document is constructed, containing either a status message with the web meta-information, or an error message. This document is returned as the response to the server program which in turn sends it to the client communication interface module as described earlier.

The client authoring tool calls the SetDocumentMetainfo API procedure to modify the meta information about a document that is stored on the server machine. The procedure initiates a SET_DOCUMENT_METAINFO _transaction to modify the meta information about a document that is stored on the server machine.

In response to such a transaction request, the server extension program locates the document meta information file associated with the saved document, as described earlier. The contents of the document meta information file are modified to reflect the new attribute key value pairs contained in the SET_DOCUMENT_METAINFO _transaction request. An HTML document is then constructed containing either a status message with the document meta-information, or an error message. This document is returned as the response to the server program which in turn sends it to the client communication interface module as described earlier.

In response to some calls made by the client authoring tool, the client communications interface module initiates a SERVER_VERSION transaction to identify the version of the server program with which it is communicating on the server machine. In response to such a transaction request, the server extension program locates the server version information, such as shown in FIG. 6C. An HTML document is then constructed containing either a status message with the server version information, or an error message. This document is returned as the response to the server program which in turn sends it to the client communication interface module as described earlier.

These and other functions can be provided to enhance the authoring, creation and maintenance of on-line services. It should be understood that the foregoing description provided example operations that would be useful in a client/server authoring environment. Other operations and variations are possible.

One of the advantages of this invention is that it allows client server authoring operations for a web, in a way which is independent of the particular server machine hardware or operating system software, and which is also independent of the HTTP server program implementation. The independence with respect to server platform and server program is achieved through the use of primarily four techniques. First, standard techniques may be used for writing portable software that may then be compiled on several different platforms. Next, use of the standard HTTP protocol as the communications protocol over the prior art standard TCP/IP protocol achieves platform and server independent communication. Additionally, use of the CGI protocol as a means of invoking the server extensions from the HTTP server program, and as a means for passing parameter information from the server to the server extensions provides additional server program independence. Finally, the data content carried by the HTTP protocol messages do not contain any platform or server dependent information. Thus, this system can be implemented and used with ordinary HTTP server programs without custom modification, as long as the server supports the CGI standard.

Another advantage of this system is that the client authoring tool does not need to map the file name space of the server to its own file name space. This arrangement is particularly advantageous in large networks, such as the Internet, where there may be many authors of many on-line services on many servers. In this environment, the ability to remotely author documents is made easier and eliminates the need for complex file systems like a network file system.

Another advantage of this system is that the ability to store files on the server is made possible in a manner which is transparent to usage by a Web browser. By using a server extension program to control processing of messages, the server also need not be modified. The server is simply configured to recognize the server extension program, thus allowing easy installation. Alternatively, the functionality of the server extension program might be embedded in the web server itself and need not be as an implemented CGI script.

Having now described an embodiment of the invention, it should be understood that the foregoing description is merely illustrative, having been presented by way of example only. Numerous other embodiments and modifications may be made. For example, the invention is not limited to use on the Internet or using the World Wide Web or private web such as an internal corporate web or using the HTTP communication protocol. For example, the file transfer protocol (FTP) could also be used, using "get" and "put" commands in that protocol. Other protocols using messages communicated over TCP/IP connections are also possible. A mix of such protocols may also be used to perform retrieval or storage functions. It is also possible that a service author will keep local copies of document objects of an on-line service so that only a remote storage function is used. Additionally, systems in which a client program modifies and stores documents and programs on the server using protocols over a TCP/IP connection between the client and the server are also within the scope of the invention. The client and server may be connected by the Internet, or a private local or wide area network or may be on the same machine. The client authoring tool may be configured to communicate only with the server such as by using a dedication communication channel or link. The processing of messages need not be provided by a server extension program added to the server, but may also be made possible by modifications to the server. These and other embodiments are considered to be within the scope and spirit of the present invention which is defined by the appended claims.

What is claimed is:

1. A client/server system for authoring an on-line service on a server, comprising:
   (a) a client having an authoring tool for performing authoring operations on information comprising the on-line service, each authoring operation corresponding to at least one transaction that is performed by the server, said client being able to selectively execute any of a plurality of functions, including:
      (i) generating independent requests for authoring operations to be performed on information on the server;
      (ii) translating the independent requests into at least one HTTP request message to be sent to the server, the at least one HTTP request message including information identifying a type of transaction, parameter values for the transaction and a process to be invoked on the server to perform the transaction; and
      (iii) transmitting the at least one HTTP request message to the server; and
   (b) the server storing information authored using the authoring tool, said server being able to execute a plurality of functions, including:
      (i) receiving the at least one HTTP request message from the client; and
      (ii) performing authoring operations identified in the at least one HTTP request message received from the client so as to author information on the server.

2. The client/server computer system of claim 1, wherein the plurality of functions executable by the client further comprise:
   (a) initiating a TCP/IP connection between the client and the server; and
   (b) constructing the HTTP request message having data, wherein the data includes information identifying a type of transaction, parameter values for the transaction and a process to be invoked on the server to perform the transaction.

3. The client/server computer system of claim 2, wherein the plurality of functions executable by the client further comprise displaying information about the transaction in response to the reception of an HTTP response message from the server the HTTP response message including data generated by of the server when performing the authoring operations.

4. The client/server computer system of claim 3, wherein the HTTP response message comprises data in a markup language that is parsed by the client to obtain information requested from the server.

5. The client/server computer system of claim 1, wherein the authoring operations include an operation to modify data files on the server.

6. The client/server computer system of claim 1, wherein the authoring operations include an operation to manipulate meta information for the on-line service on the server.

7. The client/server computer system of claim 1, wherein the authoring operations include an operation to create document objects on the server.

8. The client/server computer system of claim 1, wherein the client has a set of procedures for performing the authoring operations on the on-line service, including a procedure for saving a document object on the server, wherein each of the procedures are individually selectable.

9. The client/server computer system of claim 2, wherein the plurality of functions executable by the server further comprise:
   (a) receiving the HTTP request message;
   (b) detecting a request for an authoring operation to be performed on information on the server;
   (c) invoking the authoring operation to be performed via a common gateway interface when the request for authoring operation is detected;
   (d) receiving an HTML document as a result of performance of the requested authoring operation; and
   (e) transmitting the HTML document to the client as a result of the requested authoring operation.

10. The client/server computer system of claim 1, wherein the plurality of functions executable by the client further comprise:
    (a) receiving a response message from the server; and
    (b) displaying information about the performance of the authoring operation by the server using the response message.

11. The client/server computer system of claim 2, wherein the plurality of functions executable by the client further comprise:
    (a) detecting an arrival of an HTTP response message from the server machine; and
    (b) completing the authoring operation on the client when the arrival of the HTTP response message has been detected.

12. The client/server system of claim 1, wherein the plurality of functions executable by the client further comprise:
    (a) detecting the arrival of a response message from the server;
    (b) completing the associated authoring operation on the client in response to the detection of the arrival of the response message from the server.

13. The client/server system of claim 12, wherein the plurality of functions executable by the client further comprise performing operations on the client after the sending of the at least one HTTP request message to the server and before the arrival of the HTTP response message from the server, which operations do not depend on the results of the authoring operations performed on the server.

14. The client/server computer system of claim 1, wherein an operating system of the client has a file name space, which does not include or map to another file name space on the server.

15. The client/server computer system of claim 1, wherein the authoring tool further comprises a server extension program executed on the server by another server extension program via a common gateway interface.

16. The client/server computer system of claim 1, wherein the server employs HTTP to communicate with the client and perform authoring operations.

17. A client/server system for authoring an on-line service on a server, comprising:
    (a) a client having an authoring tool for performing authoring operations on the server using information comprising the on-line service, each authoring operation corresponding to at least one transaction that is performed by the server, said client being able to execute a plurality of functions, including:

(i) generating an HTTP request for an authoring operation to be performed on information stored on the server; and (ii) translating the HTTP request into a message to be sent to the server, the message including information identifying a type of transaction, parameter values for the transaction and a process to be invoked on the server to perform the transaction; and (iii) transmitting said message to the server with a machine independent protocol; and (b) a memory on the server for storing information authored using the authoring tool, said memory including: a plurality of functions being executable, including:

(i) receiving the message that is transmitted with said protocol from the client;

(ii) performing an authoring operation identified in said message so as to author information on the server.

* * * * *

UNITED STATES PATENT AND TRADEMARK OFFICE
CERTIFICATE OF CORRECTION

PATENT NO. : 5,793,966

DATED : August 11, 1998

INVENTOR(S) : Peter R. Amstein et al.

It is certified that error appears in the above-identified patent and that said Letters Patent is hereby corrected as shown below:

| Column | Line | |
|---|---|---|
| 3 | 40 | "*Locators(URL) ,*" should read --*Locators (URL)*,-- |
| 5 | 62 | "MIME(Multipurpose" should read --MIME (Multipurpose-- |
| 6 | 32-33 | After "server." continue in the same paragraph, do not begin a new paragraph |
| 14 | 18-19 | After "OF THE DRAWING" begin a new paragraph with --In the drawing,-- |
| 16 | 7-8 | After "module." continue in the same paragraph, do not begin a new paragraph |
| 17 | 25 | "informnation" should read --information-- |
| 19 | 45 | "vti-timecreated" should read --vti_timecreated-- |
| 21 | 7 | "C++programnming" should read --C++ programming-- |
| 22 | 3 | "CREATE_SERVICES" should read -- CREATE_SERVICE-- |

UNITED STATES PATENT AND TRADEMARK OFFICE
CERTIFICATE OF CORRECTION

PATENT NO. : 5,793,966
DATED : August 11, 1998
INVENTOR(S) : Peter R. Amstein et al.

It is certified that error appears in the above-identified patent and that said Letters Patent is hereby corrected as shown below:

| Column | Line | |
|---|---|---|
| 23 | 57 | "SET_SERVICE" should read --SET_SERVICE_METAINFO-- |
| 27 | 10 | "SetServiceMetainfo" should read ---SetServiceMetainfo -- |
| 27 | 33 | "_transaction" should read --transaction-- |
| 27 | 41 | "_transaction" should read --transaction-- |
| 29 (Claim 1) | 15 | After "generating" insert --machine-- |
| 29 (Claim 1) | 18 | After "the" insert --machine-- |
| 29 (Claim 3) | 47 | Delete "the" |
| 32 (Claim 17) | 6 | After "client;" insert --and-- |

Signed and Sealed this

Sixth Day of April, 1999

Attest:

Q. TODD DICKINSON

Attesting Officer

Acting Commissioner of Patents and Trademarks